(12) United States Patent
Maeda et al.

(10) Patent No.: US 8,630,962 B2
(45) Date of Patent: Jan. 14, 2014

(54) ERROR DETECTION METHOD AND ITS SYSTEM FOR EARLY DETECTION OF ERRORS IN A PLANAR OR FACILITIES

(75) Inventors: Shunji Maeda, Yokohama (JP); Hisae Shibuya, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 289 days.

(21) Appl. No.: 13/057,831

(22) PCT Filed: May 29, 2009

(86) PCT No.: PCT/JP2009/002391
§ 371 (c)(1),
(2), (4) Date: Apr. 20, 2011

(87) PCT Pub. No.: WO2010/041355
PCT Pub. Date: Apr. 15, 2010

(65) Prior Publication Data
US 2011/0191076 A1    Aug. 4, 2011

(30) Foreign Application Priority Data
Oct. 9, 2008 (JP) .................. 2008-263030

(51) Int. Cl.
*G06F 15/18* (2006.01)
(52) U.S. Cl.
USPC .......................................... 706/12
(58) Field of Classification Search
None
See application file for complete search history.

(56) References Cited

U.S. PATENT DOCUMENTS

| | | |
|---|---|---|
| 6,216,066 B1 | 4/2001 | Goebel et al. |
| 6,952,662 B2 | 10/2005 | Wegerich et al. |
| 6,975,962 B2 | 12/2005 | Wegerich et al. |

(Continued)

FOREIGN PATENT DOCUMENTS

| | | |
|---|---|---|
| JP | 07-028766 | 1/1995 |
| JP | 2000-184593 | 6/2000 |

(Continued)

OTHER PUBLICATIONS

Lee "Local fuzzy PCA based GMM with dimension reduction on speaker identification", Pattern Recognition Letter, 2005, pp. 1811-1817.*

(Continued)

*Primary Examiner* — Li-Wu Chang
(74) *Attorney, Agent, or Firm* — Antonelli, Terry, Stout & Kraus, LLP.

(57) ABSTRACT

Provided are a method which permits complete training data and data with added errors, and enables the early and accurate discovery of errors in facilities such as a plant, and a system thereof. To achieve the objectives, (1) the behavior of temporal data is observed over time, and the trace is divided into clusters; (2) the divided cluster groups are modeled in sub spaces, and the discrepancy values are calculated as errors candidates; (3) the training data are used (compare, reference, etc.) for reference to determine the state transitions caused by the changes over time, the environmental changes, the maintenance (parts replacement), and the operation states; and (4) the modeling is a sub space method such as regression analysis or projection distance method of every N data removing N data items, (N=0, 1, 2, ... ) (for example, when N=1, one error data item is considered to have been added, this data is removed, then the modeling is performed), or a local sub space method. Linear fitting in regression analysis is equivalent to the lowest order regression analysis.

14 Claims, 24 Drawing Sheets

(56) References Cited

U.S. PATENT DOCUMENTS

| | | | |
|---|---|---|---|
| 2006/0269144 A1 | 11/2006 | Kubota et al. | |
| 2008/0068593 A1* | 3/2008 | Nakano et al. | 356/73 |
| 2009/0091443 A1* | 4/2009 | Chen et al. | 340/540 |

FOREIGN PATENT DOCUMENTS

| | | |
|---|---|---|
| JP | 2006-107179 | 4/2006 |
| JP | 2006-252259 | 9/2006 |
| JP | 2006-330988 | 12/2006 |
| JP | 2007-198918 | 8/2007 |

OTHER PUBLICATIONS

European Search Report for Application No./Patent No. 09818896.4-1239 / 2333629 PCT/JP2009002391, issued on Dec. 5, 2012.

He, et al., "Subspace-based gearbox condition monitoring by kernel principal component analysis", vol. 21, No. 4, Feb. 7, 2007, pp. 1755-1772.

Stephan W. Wegerich et al., Nonparametric Modeling of Vibration Signal Features for Equipment Health Monitoring, Aerospace Conference, 2003 Proceeding, 2003 IEEE, pp. 3113-3121 vol. 7.

Office Action issued in Japanese Patent Application No. 2012-160379 on Aug. 20, 2013.

* cited by examiner

MULTI-DIMENSIONAL TIME-SERIES SIGNALS

CORRELATION MATRIX

|  | SIGNAL 1 | SIGNAL 2 | SIGNAL 3 | SIGNAL 4 |
|---|---|---|---|---|
| SIGNAL 1 | 1.000 | −0.991 | 0.781 | 0.990 |
| SIGNAL 2 | −0.991 | 1.000 | −0.814 | −0.992 |
| SIGNAL 3 | 0.781 | −0.814 | 1.000 | 0.816 |
| SIGNAL 4 | 0.990 | −0.992 | 0.816 | 1.000 |

Wavelet ANALYSIS

1: CALCULATE DEVIATION FROM TRAINING MODEL (INDIVIDUAL) (SECURE PROVISION OF RESPONSIVITY)
2: CALCULATE DEVIATION FROM CURRENT MODEL (INDIVIDUAL)
3: CALCULATE STATE CHANGE FROM TRAINING MODEL AND CURRENT MODEL
4: CALCULATE OVERALL DEVIATION
5: INCORPORATE PHYSICAL MODEL INTO MODELING (1) (PHYSICAL MODEL IS INCORPORATED BY USING PAST PERFORMANCE AS MODEL)

ERROR DETECTION METHOD AND ITS SYSTEM FOR EARLY DETECTION OF ERRORS IN A PLANAR OR FACILITIES

TECHNICAL FIELD

The present invention relates to a method for early error-detection in plants, facilities and the like.

BACKGROUND ART

Electric-power companies use heat waste from a gas turbine or the like to provide heated water for district heating and to provide high-pressure steam and low-pressure steam for factories. Petrochemical companies operate a gas turbine and/or the like as a power supply facility. Early detection of an error generated in a gas turbine or the like utilized in various plants or facilities is vitally important, because the early error detection enables minimization of damage to the company.

There are facilities that require early detection of errors such as generated by deterioration, operative life and the like of, not only gas turbines and steam turbines, but also water wheels in hydroelectric power stations, nuclear reactors in nuclear power stations, windmills in wind power stations, engines of air vehicles or heavy vehicles, railway vehicles, escalators and elevators, and also even batteries mounted on devices/parts. Such facilities are too numerous to mention. Recently, for health maintenance, detection of errors (various disease presentations) in connection with human body is also becoming important, as seen in brain wave measurement and diagnosis.

To address this, for example, SmartSignal Corporation in USA carries out the business of detecting errors in, mainly, engines as described in U.S. Pat. No. 6,952,662 and U.S. Pat. No. 6,975,962. In these descriptions, past data is stored as database (DB), and the similarity between observation data and past training data is calculated by a unique method. Then, data with high similarity is linearly combined to calculate an estimate value. The degree of discrepancy between the estimate value and the observation data is output. As described by General Electric corporation, referring to the contents of U.S. Pat. No. 6,216,066, there is an example of use of k-means clustering to detect errors.

PRIOR ART DOCUMENTS

Patent Document

Patent Document 1: U.S. Pat. No. 6,952,662
Patent Document 2: U.S. Pat. No. 6,975,962
Patent Document 3: U.S. Pat. No. 6,216,066
Non-Patent Document
Non-Patent Document 1: Stephan W. Wegerich; Nonparametric modeling of vibration signal features for equipment health monitoring, Aerospace Conference, 2003. Proceedings. 2003 IEEE, Volume 7, Issue, 2003 Page(s): 3113-3121

SUMMARY OF INVENTION

Technical Problem

In the technique employed by SmartSignal Corporation, past training data stored in a database is required to comprehensively include various states. If observation data is observed but not found in the training data, all the observation data is treated as being not contained in the training data, which is then determined as an discrepancy value. Even when being a normal signal, this is determined as an error, resulting in a significant decrease in the reliability of test. Therefore, the user must store all data on various past states as a DB.

On the other hand, if an error is added to the training data, the degree of dissociation from the observation data representative of an error is reduced, causing the error to be overlooked. To avoid this, a careful check must be made for preventing an error from being added to training data.

In this manner, in the method based on the training data suggested by SmartSignal Corporation, users are burdened with the task of comprehensively collecting data and removing errors. In particular, it is necessary to meticulously address the changes over time, environmental changes, the presence or absence of maintenance works such as parts replacement, and the like. However, addressing such changes is practically difficult and often impossible.

Since the method according to General Electric Corporation employs k-means clustering, signal behavior is not monitored. In this regard, essential error-detection is not made.

In the circumstances, it is an object of the present invention to address the technical problem and to provide a method and a system for detecting errors which are capable of permitting incompleteness of training data and addition of errors to training data, reducing the load on users, and further achieving early and high sensitive detection of errors.

Problem to be Solved by the Invention

To achieve the objectives, in the present invention (1) the behavior of temporal data is observed over time, and the trace is divided into clusters; (2) the divided cluster groups are modeled in sub spaces, and the discrepancy values are calculated as errors candidates; (3) the training data are used (compare, reference, etc.) for reference to determine the state transitions caused by the changes over time, the environmental changes, the maintenance (parts replacement), and the operation states; and (4) the modeling is a sub space method such as regression analysis or projection distance method of every N data removing N data items, (N=0, 1, 2, . . . ) (for example, when N=1, one error data item is considered to have been added, this data is removed, then the modeling is performed), or a local sub space method.

Further, (5) based on the sub space method, the outputs of a plurality of discriminators are integrated for error determination. Note that linear fitting in regression analysis is equivalent to the lowest order regression analysis.

Effect of Invention

According to the present invention, addition of an error into training data can be permitted even if the training data is not complete, and accordingly early and accurate discovery of errors in facilities such as plants and the like is made possible. That is, there is not a necessity to comprehensively collect data with reference to training of a normal area and each state as is done in the technique of SmartSignal Corporation.

MODE FOR CARRYING OUT THE INVENTION

The contents of the present invention will be described below in detail with reference to the following embodiments.
Embodiment 1

Figure 1:
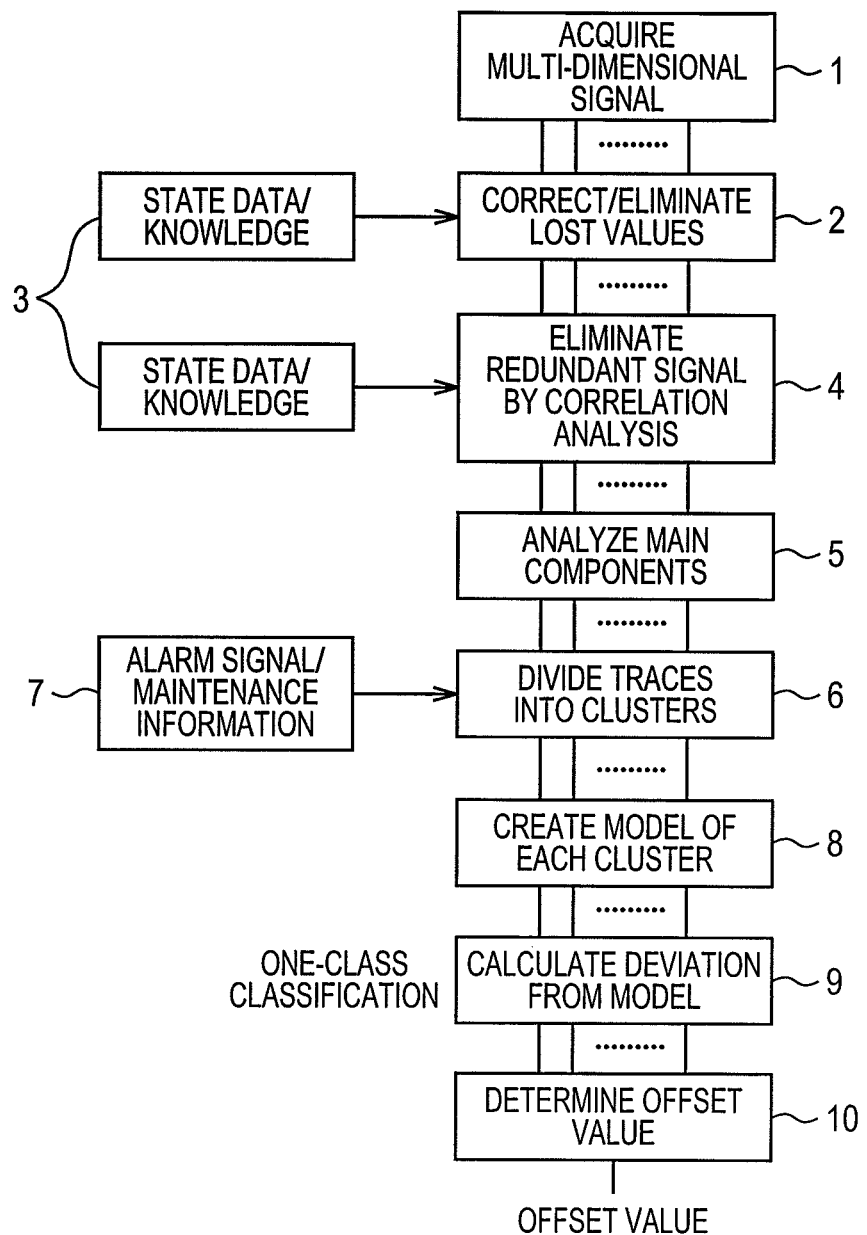
[FIG. 1] A chart illustrating a first embodiment according to the present invention.
Figures 2, 3:
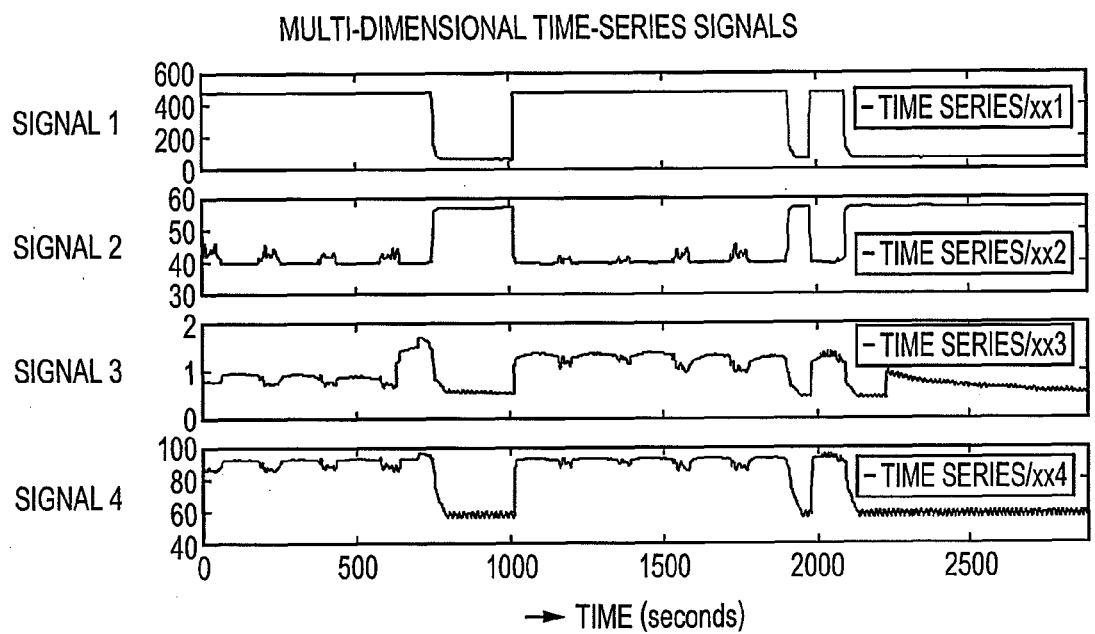
[FIG. 2] Examples of multi-dimensional time-series signals.
[FIG. 3] An example of a correlation matrix.

For the purpose of simplified description, in the present application, the same signs are used to refer to the same components. An embodiment according to the present invention is shown in FIG. 1, and examples of signals of interest are shown in FIG. 2. The signals of interest are a plurality of time-series signals as show in FIG. 2. FIG. 2 illustrates four types, series 1, 2, 3 and 4, of signals. In actual, the number of types of signal is not limited to four, and may possibly be in a range from several hundreds to several thousands.

Each of the signals corresponds to output from each of sensors provided in an intended plant or facility. For example, a temperature of a cylinder, oil, cooling water or the like, a pressure of oil or cooling water, a rotational speed of a shaft, a temperature of a room, an operating time, or the like is observed by the various sensors at regular intervals of several times a day, in real time or the like. The signals not only represent output and states, but also may be control signals (input) for controlling something. The control may be ON/OFF control or may possibly be control for obtaining a constant value. Sets of data may have a high correlation with each other or a low correlation with each other. All those signals can be subject to detection. It is determined from the data whether or not an error occurs. The signals are treated as multi-dimensional time-series signals here.

An error detection method shown in FIG. 1 is described. First, a multi-dimensional signal acquisition unit 1 acquires a multi-dimensional time-series signal. Then, if the acquired multi-dimensional time-series signal has loss, a lost-value correction/elimination unit 2 corrects/eliminates a lost value. The loss correction is generally made by, for example, replacement of the preceding data with the following data or replacement of the moving average. In the elimination an error as data is eliminated, for example, when many sets of data are simultaneously reset to zero. States of the facilities and knowledge of engineers are stored in a DB called state-data/knowledge 3, and the correction/elimination of a lost value may be performed based on the state-data/knowledge 3. Then, on the multi-dimensional time-series signal after the correction/elimination process, a redundant-signal-by-correlation-analysis elimination unit 4 eliminates a redundant signal determined by the correlation analysis. In this respect, as shown in the example of the correlation matrix in FIG. 3, the correlation analysis is performed on the multi-dimensional time-series signal. Then, when the similarity is extremely high, for example, when there are signals between which a correlation value is close to 1, the signals are determined as redundancy, and duplicate signals are eliminated from the signals, so that unique signals remain. In this case, the elimination is also performed based on the information stored in the state-data/knowledge 3.

Then, a main-component analysis unit 5 performs data dimension reduction. Here, a multi-dimensional time-series signal in M-dimensions is linearly transformed into an r-dimensional multi-dimensional time-series signal in dimension number r. The main component analysis is made to generate an axis representing the maximum variation. KL transformation may be utilized. The dimensional number r is determined based on a value of cumulative contribution proportion obtained by arranging eigenvalues obtained by the main component analysis in descending order and then dividing a value resulting from the addition of eigenvalues in decreasing order by the sum of all the eigenvalues.

Figure 4:
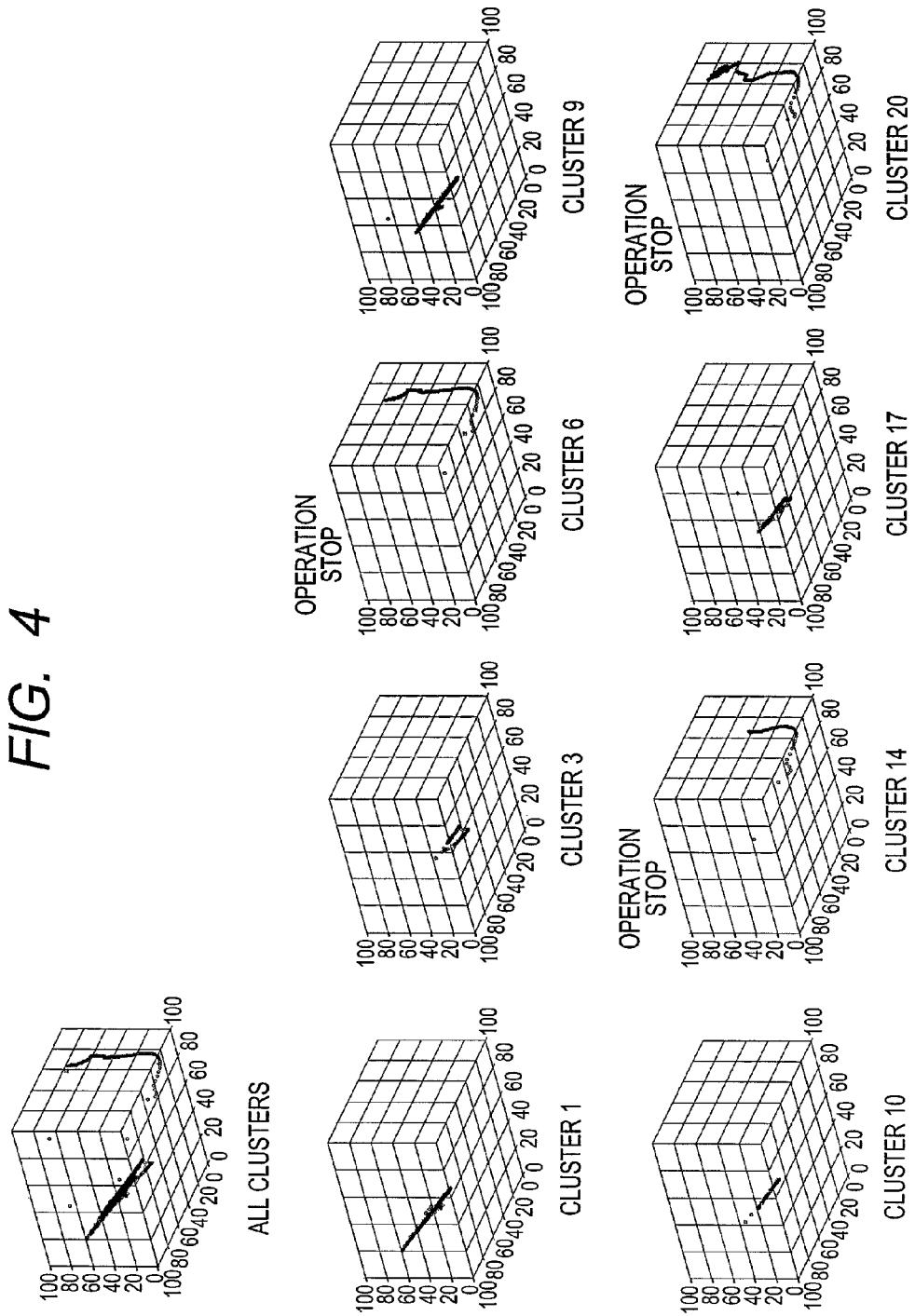
[FIG. 4] An example of the application of trace-division-based clustering.

Then, a trace-division-based clustering unit 6 performs a division of traces into clusters on the multi-dimensional time-series signal in r-dimensions. FIG. 4 shows the patterns. A three-dimensional representation (called "feature space") shown at the top left in FIG. 4 depicts a multi-dimensional time-series signal in r-dimensions after the main component analysis in three-dimensional form exhibiting a high contribution proportion. It is seen in this state that a state of the intended facility is observed as being complicated. The other 8 three-dimensional representations in FIG. 4 depict clusters into which a trace is observed over time and then divided. In the clustering, if the distance between items of data exceeds a predetermined threshold over time, the items are assigned to different clusters, but if the distance does not exceed the threshold, the items are assigned to the same cluster. It is seen from this that clusters 1, 3, 9, 10, 17 are related to the operation-ON state, and clusters 6, 14, 20 are related to the operation-OFF state. Clusters, not shown, such as cluster 2 and the like, are related to a state in a transition period. Analyzing the clusters, the trace moves linearly during the operation-ON state, and the trace moves unstably during the operation-OFF state. In this manner, it is seen that the trace-division-based clustering has several advantages.

It is possible to classify a trace into a plurality of states such as the operation-ON state, the operation-OFF state and the like.

As seen from the operation-ON state, the corresponding clusters can be expressed in a low-dimensional model such as, for example, in linear form.

For performing the clustering, an alarm signal and/or maintenance information on the facility may be added so as to attach strings to the clusters. Specifically, information on an alarm signal and/or the like is added as an attribute to each cluster.

Figure 5:
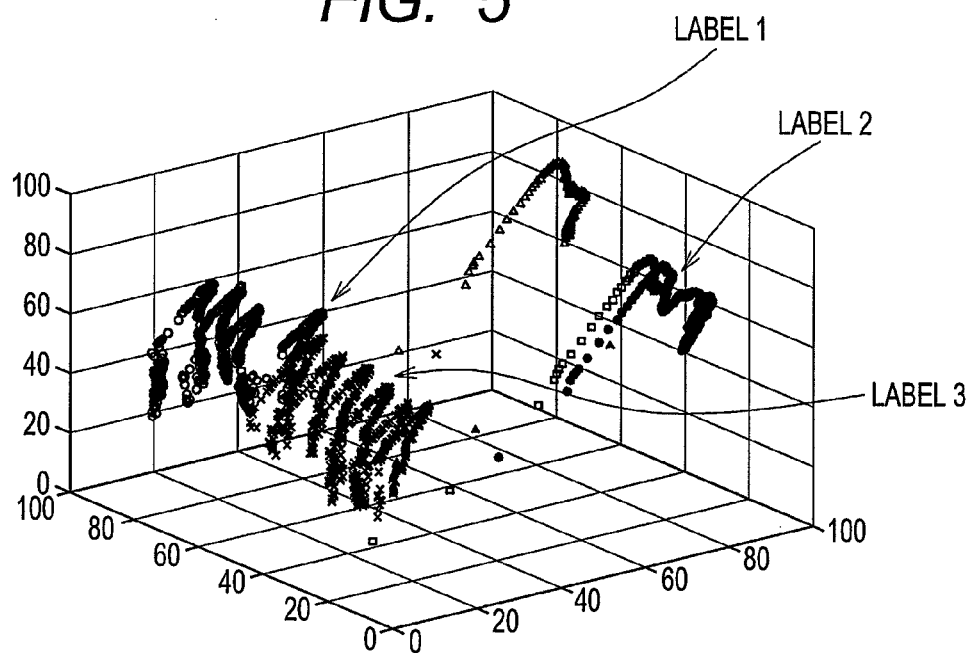
[FIG. 5] An example of the application of trace-division-based clustering.
Figure 6:
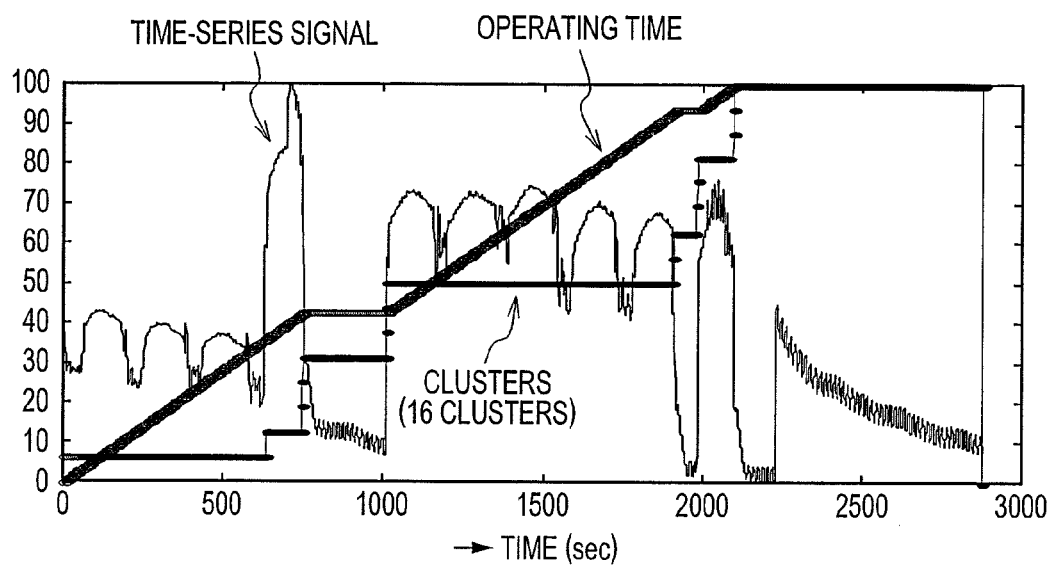
[FIG. 6] An example of the application of trace-division-based clustering.

FIG. 5 shows an example other than the clusters labeled by clustering in the feature space. FIG. 6 represents the results of clustering on one time-series signal. In this case, it is seen that 16 clusters are generated and the time-series signal is divided into the 16 clusters. Operation time (cumulative time) is also shown. A horizontal portion corresponds to the period of operation-OFF. It is seen that the operation-ON and the operation-OFF can be separated with accuracy.

Then, an each-cluster modeling unit 8 performs modeling on each of the clusters resulting from the clustering in the low-dimensional sub space. It is not necessary to limit to a normal area, and addition of an error presents no problem. Modeling is performed by, for example, regression analysis here. The following is a general expression for regression analysis. "y" corresponds to a r-dimensional multi-dimensional time-series signal for each cluster. "x" is a variable for describing "y". "y~" is a model. "e" is a deviation.

y: objective variable (r column)
b: regression coefficient (1+p column)
x: explanatory variable matrix (r row, 1+p column)
$\|y-Xb\| \Rightarrow \min$
$b=(X'X)-1X'y$ (' represents transpose)
$y~=Xb=X(X'X)-1X'y$ (portion representing the effect of explanatory variable)
$e=y-y~$ (portion which cannot be approximated by y~. The portion from which the effect of explanatory variable is removed)

Here, regression analysis of every N data removing N data items (N=0, 1, 2, . . . ) is performed on the r-dimensional multi-dimensional time-series signal in each cluster. For example, when N=1, it is through that a type of an error signal is added, so that the other signals except this are assumed as "x" and modeled. When N=0, all the r-dimensional multi-dimensional time-series signals are treated.

Figure 24:
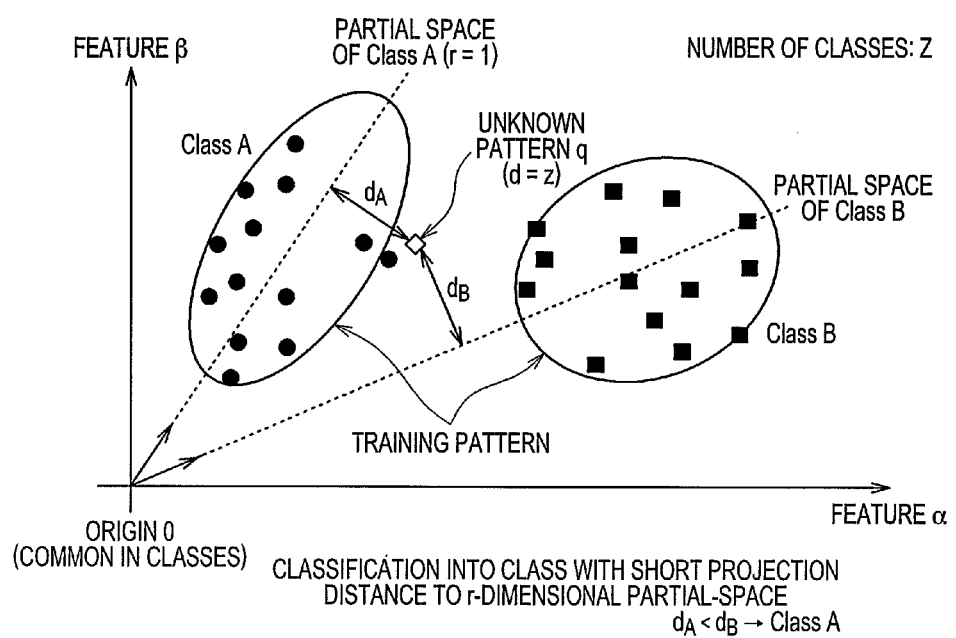
[FIG. 24] An example of a sub space method.

Other than regression analysis, a sub space method such as a CLAFIC method, a projection distance method or the like may find application. Then, a deviation-from-model calculation unit 9 calculates a deviation from the model. FIG. 24 shows in diagrammatic form a commonly-used CLAFIC method. The case of 2 classes, two-dimensional pattern is shown. A sub space for each class, that is, a sub space represented as a one-dimensional straight line here, is calculated.

In general, eigenvalue decomposition is performed on a data autocorrelation matrix for each class to derive the eigenvector as a basis. The eigenvector used corresponds to some higher-order eigenvalues of large values. Upon reception of unknown pattern q (latest observation patter), the length of an orthogonal projection into the sub space or the projection distance to the sub space is calculated. Then, the unknown pattern (latest observation pattern) q is classified into a class with the maximum length of the orthogonal projection or short projection distance.

In FIG. 24, the unknown pattern q (latest observation pattern) is classified into class A. The normal area is basically observed in the multi-dimensional time-series signal shown in FIG. 2, which thus becoming a one-class classification problem (illustrated in FIG. 1). Because of this, class A is assumed as a normal area and a distance from the unknown pattern q (latest observation pattern) to class A is calculated and determined as a deviation. When the deviation is large, it is determined as an discrepancy value. In such a sub space method, even if a certain amount of error values is added, the effect of the error values is mitigated at the time when a sub space is defined through the dimension reduction. This is an advantage of the application of sub space method.

Note that, in the projection distance method, the barycenter of each class is defined as the origin. An eigenvector obtained by applying the KL expansion for a covariance matrix for each class, is used as a basis. A variety of sub space methods are devised, and if they have a distance scale, the degree of discrepancy can be calculated. In the case of density, the degree of discrepancy can be determined from the size of density. The CLAFIC method calculates a length of orthogonal projection, thus using the similarity measure.

In this manner, a distance or a similarity is calculated in the sub space to evaluate the degree of discrepancy. The sub space method such as a projection distance method or the like uses a discriminator, so that vector quantization for updating the dictionary pattern or metric learning for learning distance function can be utilized as a learning method when error data can be used.

Figure 31:
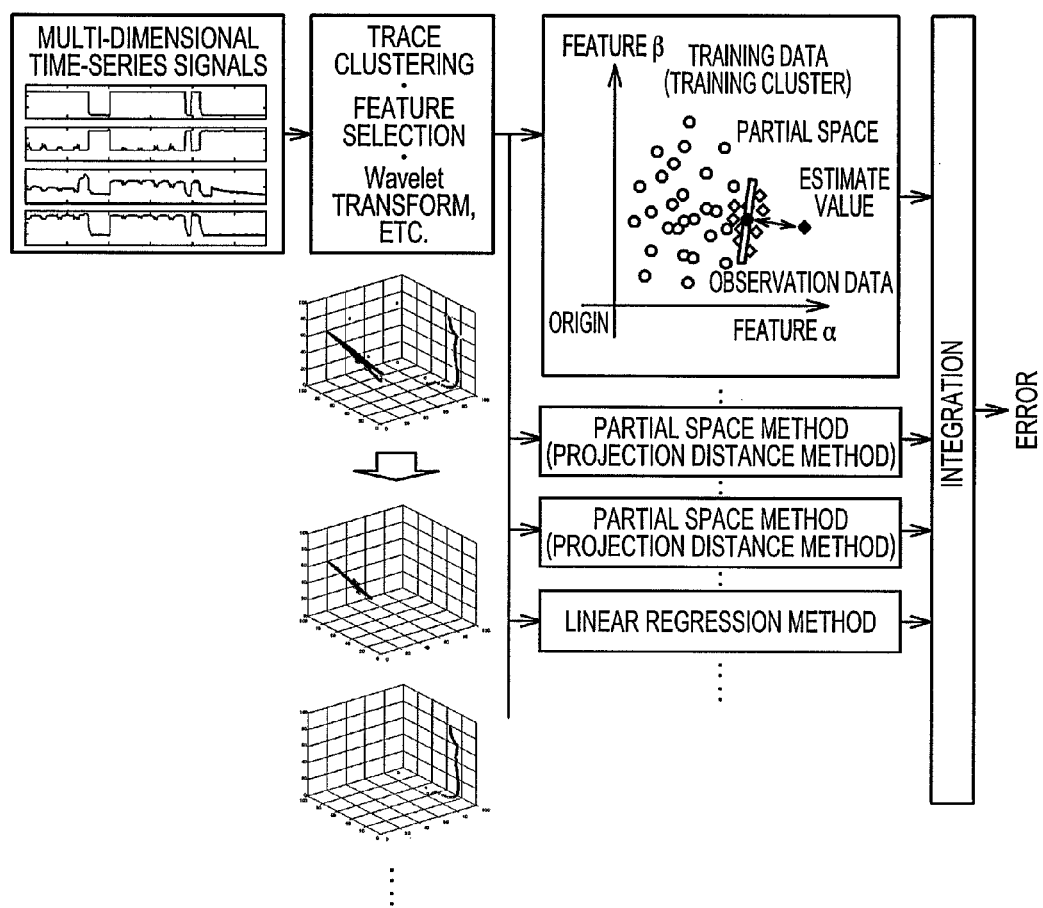
[FIG. 31] An example of error diction by integration of a plurality of discriminators.

It is also possible to apply a method, called local sub space method, of acquiring k multi-dimensional time-series signals close to unknown pattern q (latest observation pattern, then generating a linear manifold in which the nearest neighbor pattern of each class is the origin, and then classifying the unknown pattern into a class with a shortest projection distance to the linear manifold (see the frame of the local sub space method in FIG. 31). The local sub space method is a kind of the sub spaced method.

The local sub space method finds application for each cluster resulting from the clustering which has bee described. The "k" is a parameter. As in the case described earlier, in the error detection, because of a one-class classification problem, class A to which a vast majority of data belongs is assumed as a normal area and a distance from the unknown pattern q (latest observation pattern) to class A is calculated and determined as a deviation.

In this technique, it is possible to calculate, as an estimate value, a point of the orthogonal projection from the unknown pattern q (latest observation pattern) into the sub space formed by use of the k multi-dimensional time-series signals (estimate value data described in the frame of the local sub space method in FIG. 31). It is also possible to calculate an estimate value of each signal by re-arranging the k multi-dimensional time-series signals in order of increasing distance to the unknown pattern q (latest observation pattern), and then assigning weights inversely proportional to the distance. In the projection distance method, an estimate value can be calculated in a similar manner.

A parameter k is generally set as one type, but if the parameter k is changed into some types for execution, then data of interest is selected in accordance with similarity. From these results, comprehensive determination can be made. Accordingly, the local sub space method is more effective. Since the selected data within the cluster is processed in the local sub space method, even if a certain amount of error values is added, the effect of the error values is greatly mitigated at the time when a local sub space is defined.

The concept of "local" of the local sub space method can find application in the regression analysis. That is, as "y", k multi-dimensional time-series signals close to the observed unknown-pattern q are obtained, then "y~" is calculated as a model of this "y" to calculate a deviation "e".

Simply considering the one-class classification problem, discriminators such as one-class support vector machine or the like can find application. In this case, the kernel such as a radial basis function or the like for mapping in a higher order space can be used. In the one-class support vector machine, a side closer to the origin is an discrepancy value, i.e., error. However, the support vector machine is capable of accommodating even a large number of dimensions of feature value, but has a disadvantage of enormously increasing the amount of calculation as the number of items of the training data is increased.

To address this, there are applicable techniques such as described in "IS-2-10, J. Katou, M. Noguchi, T. Wada (Wakayama Univ.), K. Sakai, S. Maeda (Hitachi); Pattern no Kinsetu-sei ni Motozuku 1 Class Shikibetuki (One-class classifier based on pattern accessibility)" presented at Meeting on Image Recognition and Understanding 2007, and the like. In this technique, there is an advantage that the amount of calculation is not enormously increased even if the number of items of the training data is increased.

Figure 7:
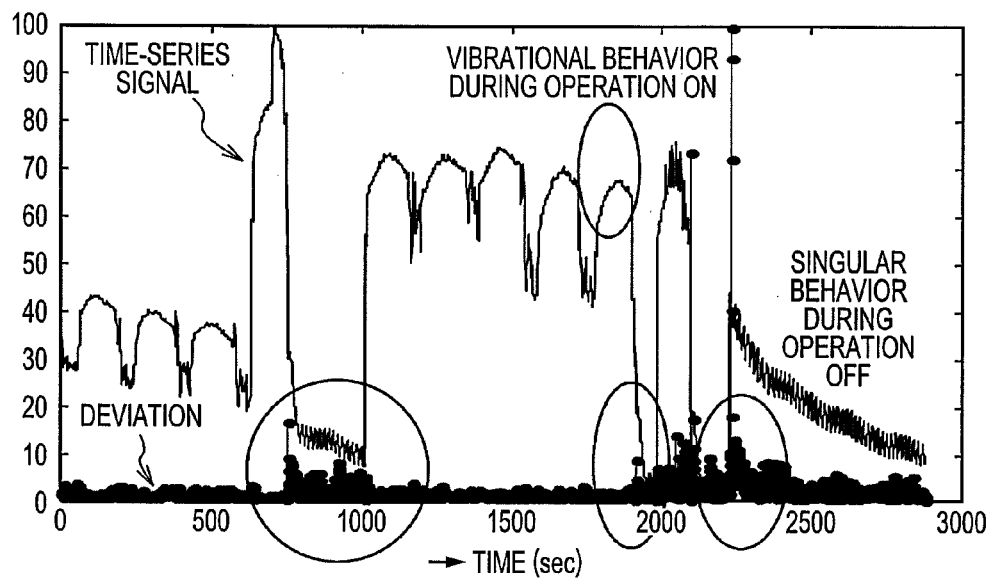
[FIG. 7] An example of a deviation from a model when a trace is divided into clusters.
Figure 8:
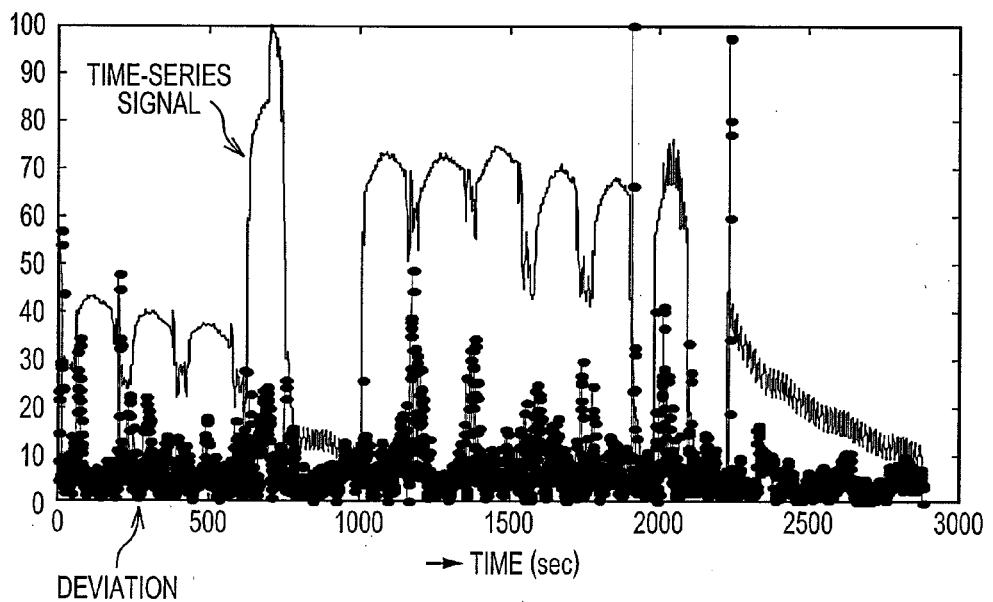
[FIG. 8] An example of a deviation from a model when a trace is not divided into clusters.

Next, taking regression analysis as an example, an example of experiments will be described. FIG. 7 shows an example that the r-dimensional multi-dimensional time-series signal is modeled by assuming N=0 and through linear regression analysis and then a deviation between the model and an actual measured value is shown. FIG. 8 shows the case when traces are not divided into clusters, for reference. In the case of FIG. 7, a large deviation can be found when the time-series signal exhibits vibrating behavior during an interval of operation-OFF and an interval of operation-ON. Finally, an discrepancy-value detection unit 10 detects an discrepancy value. Here, a difference between the discrepancy value and a threshold value is checked. The detected error signal has been subjected to the main component analysis. For this reason, this error signal can be inversely transformed to check what percentage the original signal is synthesized and the error is determined.

In this manner, expressing a multi-dimensional time-series signal in low-dimensional model with emphasis on the clustering in which traces are divided into clusters enables decomposition of a complicated state and expression in a simple mode. As a result, there is an advantage that phenomenon is easily understood. Also, since a model is set, it is not necessary to be perfectly equipped with data as done in the method of SmartSignal Corporation. There is an advantage of permitting a data gap.

Figure 28:
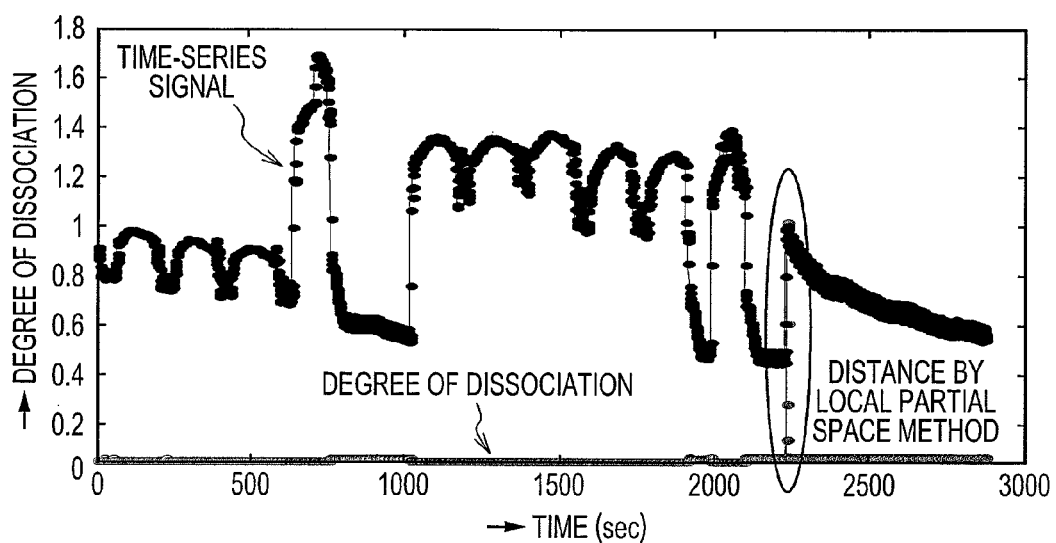
[FIG. 28] An example of the application of local sub space method.

Next, FIG. 28 shows an example of the application of local sub space method. This is the example that a signal is divided into two, the first half and the second half, (in accordance with the method of verification, called cross validation), then they are respectively assumed as training data, and then a distance to the remaining data is measured. Parameter k is assumed as 10. Parameter k is changed into some values, and by choosing the majority of them, a stable result can be obtained (based on an idea similar to a Bagging technique described later). This local sub space method has an advantage that "removing N data items" is automatically carried out. In the example of the application in FIG. 28, irregular behavior during the operation OFF is detected.

Figure 29:
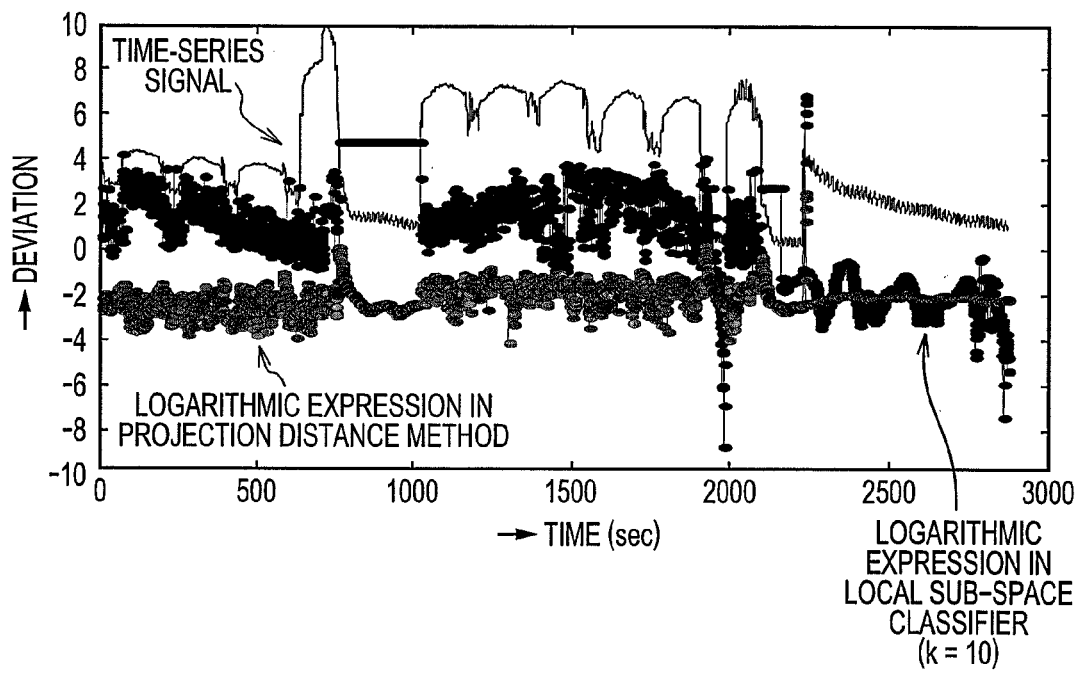
[FIG. 29] An example of the application of projection distance method, a local sub space method.

In the above example, the need of clustering is also mitigated, but clusters other than the clusters to which the observation data belongs are assumed as ones for training data, and the local sub space method may be applied for the data and the observation data. With this method, the degree of dissociation from another cluster can be evaluated. The same holds for the projection distance method. FIG. 29 shows an example of them. Clusters other than the cluster to which the observation data belongs are assumed as training data. This idea is effective when similar data continue like time-series data, because the most similar data can be eliminated from a "local" region. Note that the removal of N data items is described as feature value (sensor signal), but may be data in the direction of time axis.

Figure 9:
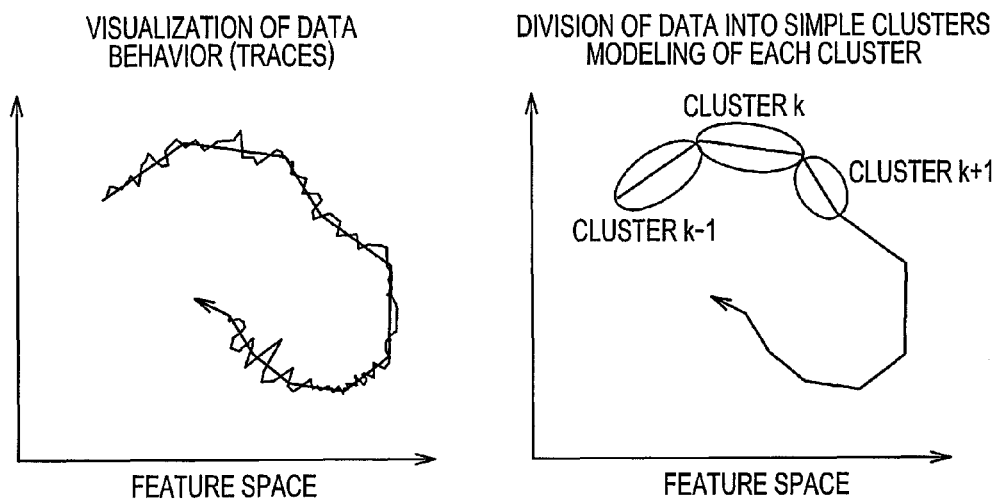
[FIG. 9] An example of data representation in a feature space.
Figure 10:
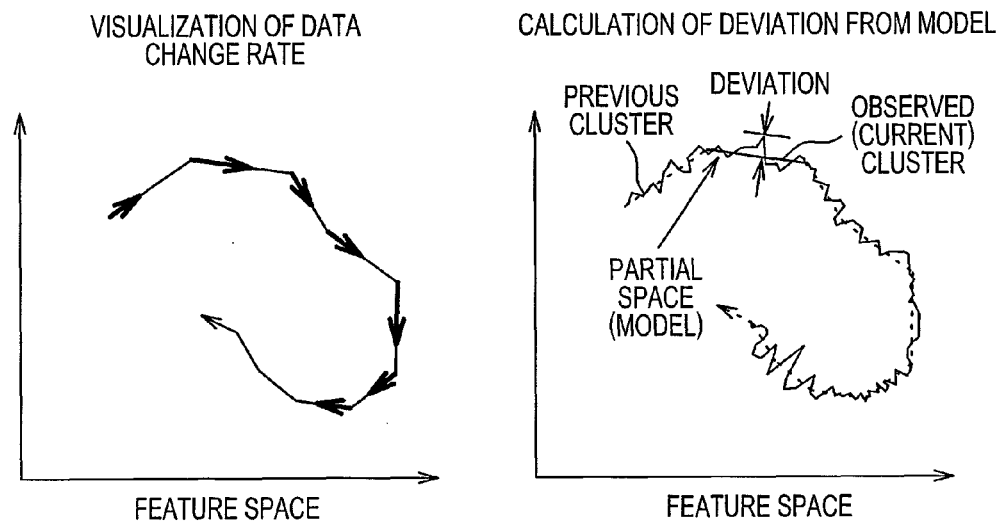
[FIG. 10] Another example of data representation in a feature space.

Next, a data representation form will be described with reference to some of the drawings. FIG. 9 shows a few examples. The left-hand diagram in FIG. 9 two-dimensionally represents a r-dimensional time-series signal after the main component analysis. This is an example of visualizing data behavior. The right-hand diagram in FIG. 9 shows clusters resulting from the trace-division-based clustering. This is an example of expressing each cluster in a simple low-order model (straight line, here). The left-hand drawing in FIG. 10 is an example showing such that the moving speed of data is apparent. If Wavelet analysis described later applies, the speed, or frequency, can also be analyzed and treated as multivariate data. The right-hand drawing in FIG. 10 is an example expressing such that a deviation from the model shown in the right-hand drawing in FIG. 9 is apparent.

Figure 11:
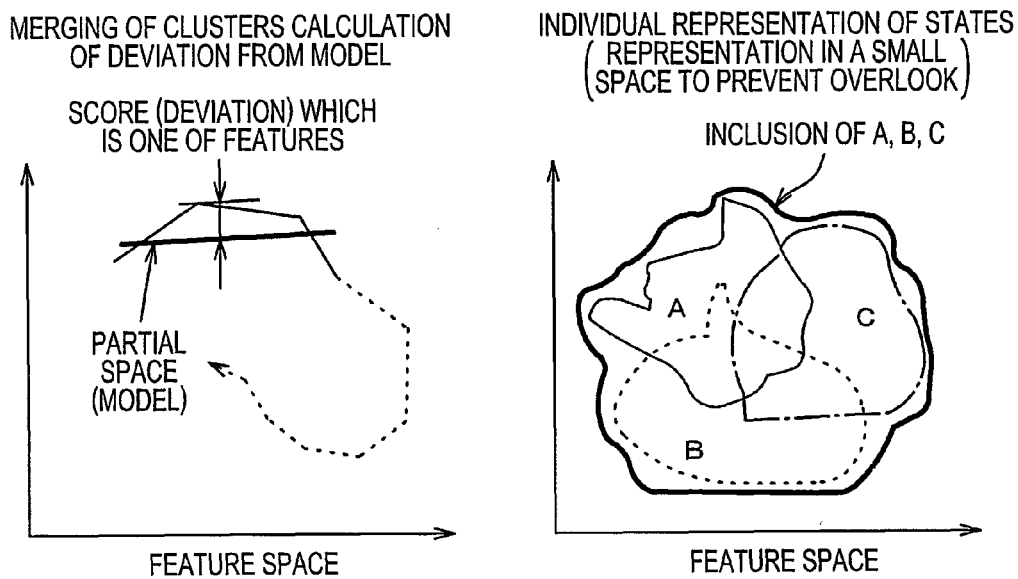
[FIG. 11] Still another example of data representation in a feature space.

The left-hand drawing in FIG. 11 is another example.

This is an example of merging clusters determined to be similar based on a distance criterion or the like (the drawing showing merging of adjacent clusters), which shows a model after the merging and a deviation from the model. The right-hand drawing in FIG. 11 represents states. Three types of states A, B and C are individually displayed. Considering separately states, a change of state A and the like can be shown as shown in the left-hand drawing in FIG. 12.

Figure 12:
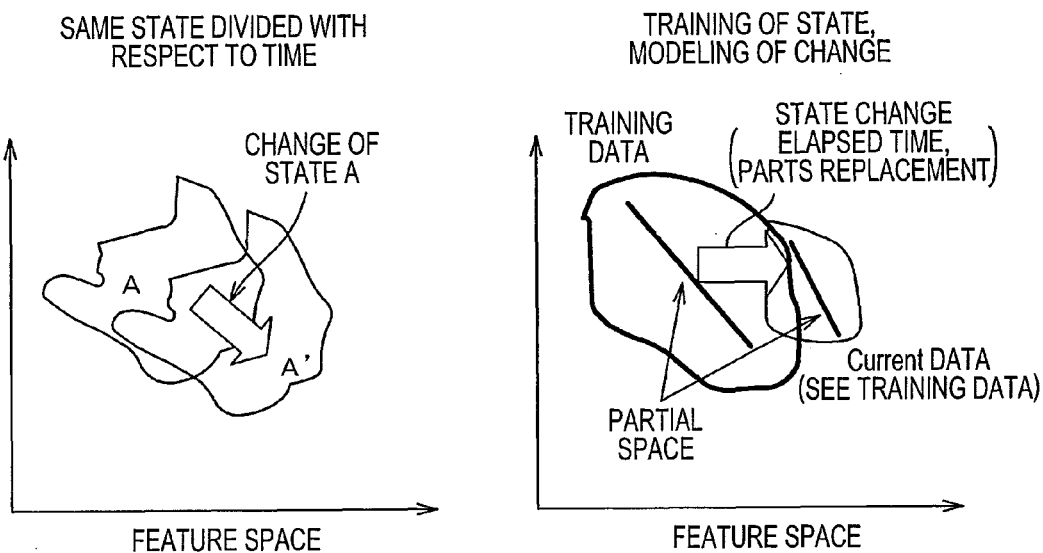
[FIG. 12] Yet another example of data representation in a feature space.

In view of the example in FIG. 6, even within the same operation-ON state, different behaviors are exhibited before and after the operation OFF. The different behaviors are able to be expressed in the feature space. The right-hand drawing in FIG. 12 shows a change from a model (low-order sub space) obtained from past training data, from which a state change can be observed. In this manner, data can be manipulated and the manipulated data can be displayed for the user for visualization of a current situation in order to promote a better understanding.

Figure 13:
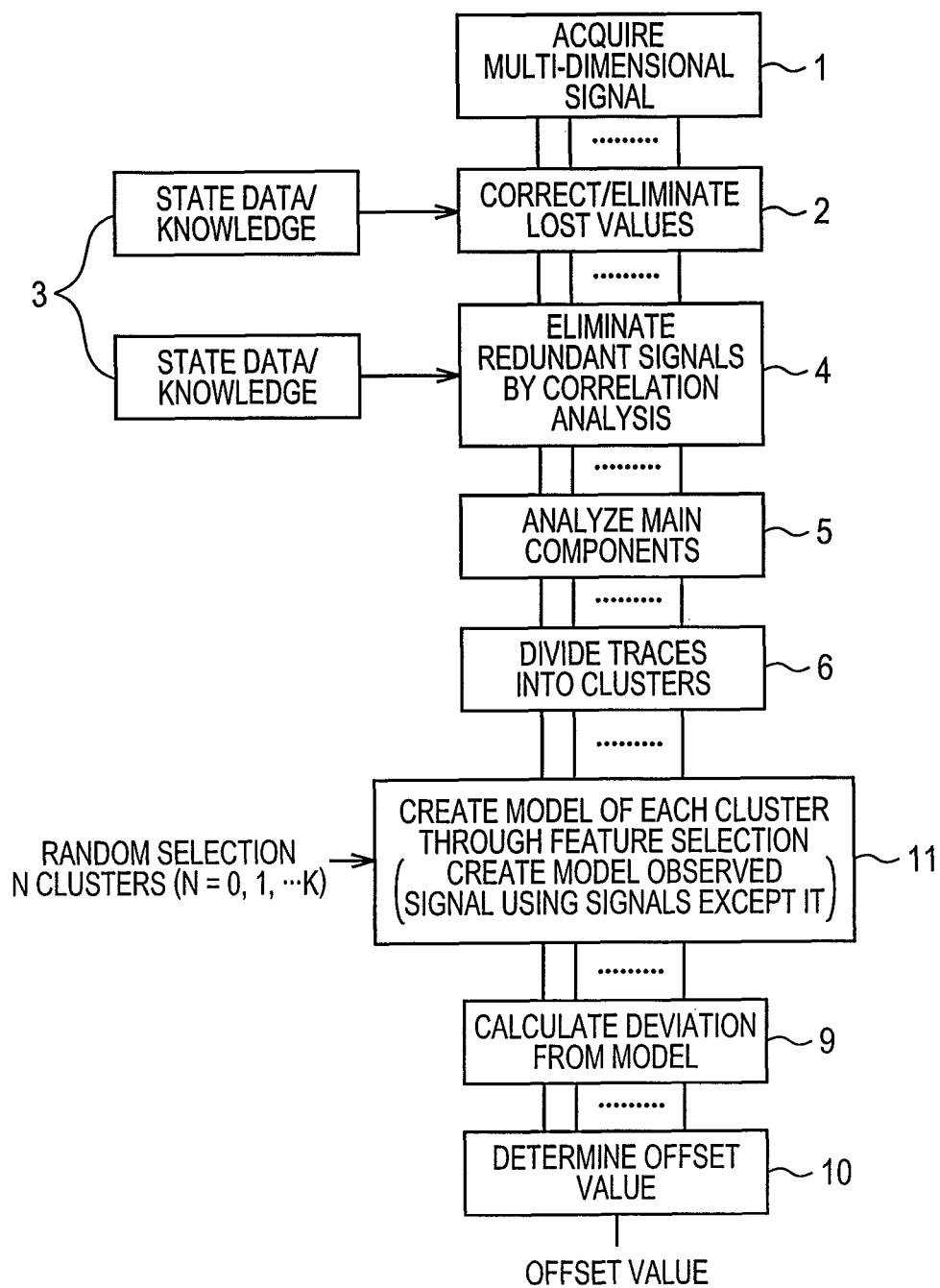
[FIG. 13] A chart illustrating a second embodiment according to the present invention.

Next, another embodiment will be described. The blocks already described are omitted. FIG. 13 shows an error detection method. Here, for each cluster, a randomly determined number of r-dimensional multi-dimensional time-series signals are selected. The random selection offers advantages of:

uncovering characteristics which are hidden from view when all the signals are used;
removing invalid signals; and
shortening the calculation time as compared with the use of all combinations.

In another possible selection, a randomly determined number
of r-dimensional multi-dimensional time-series signals are selected in the direction of the time axis.

This may be done in units of clusters, but a cluster is segmented and then a predetermined number of sub-clusters are randomly selected.

Figure 14:
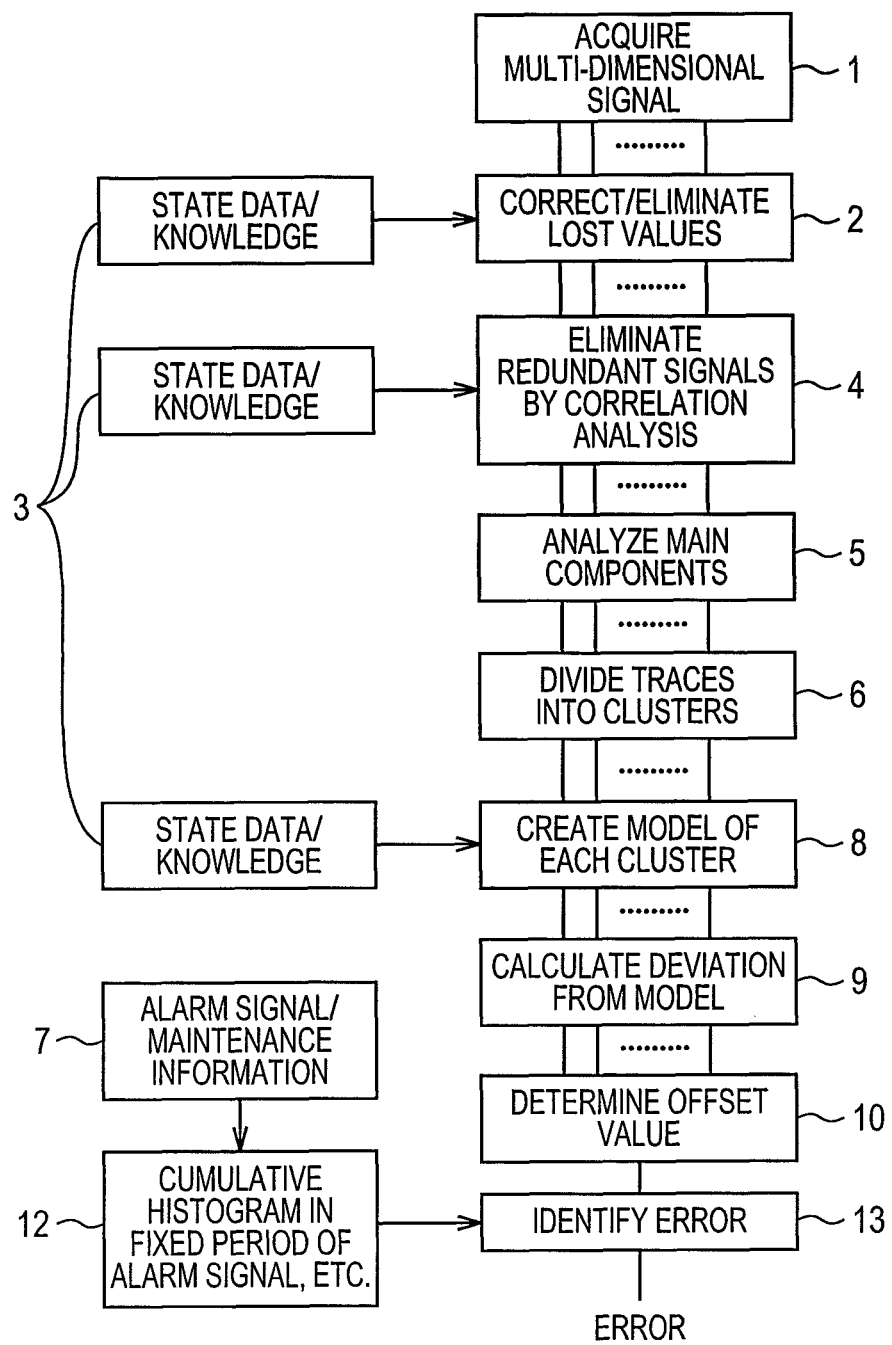
[FIG. 14] A chart illustrating a third embodiment according to the present invention.
Figure 15:
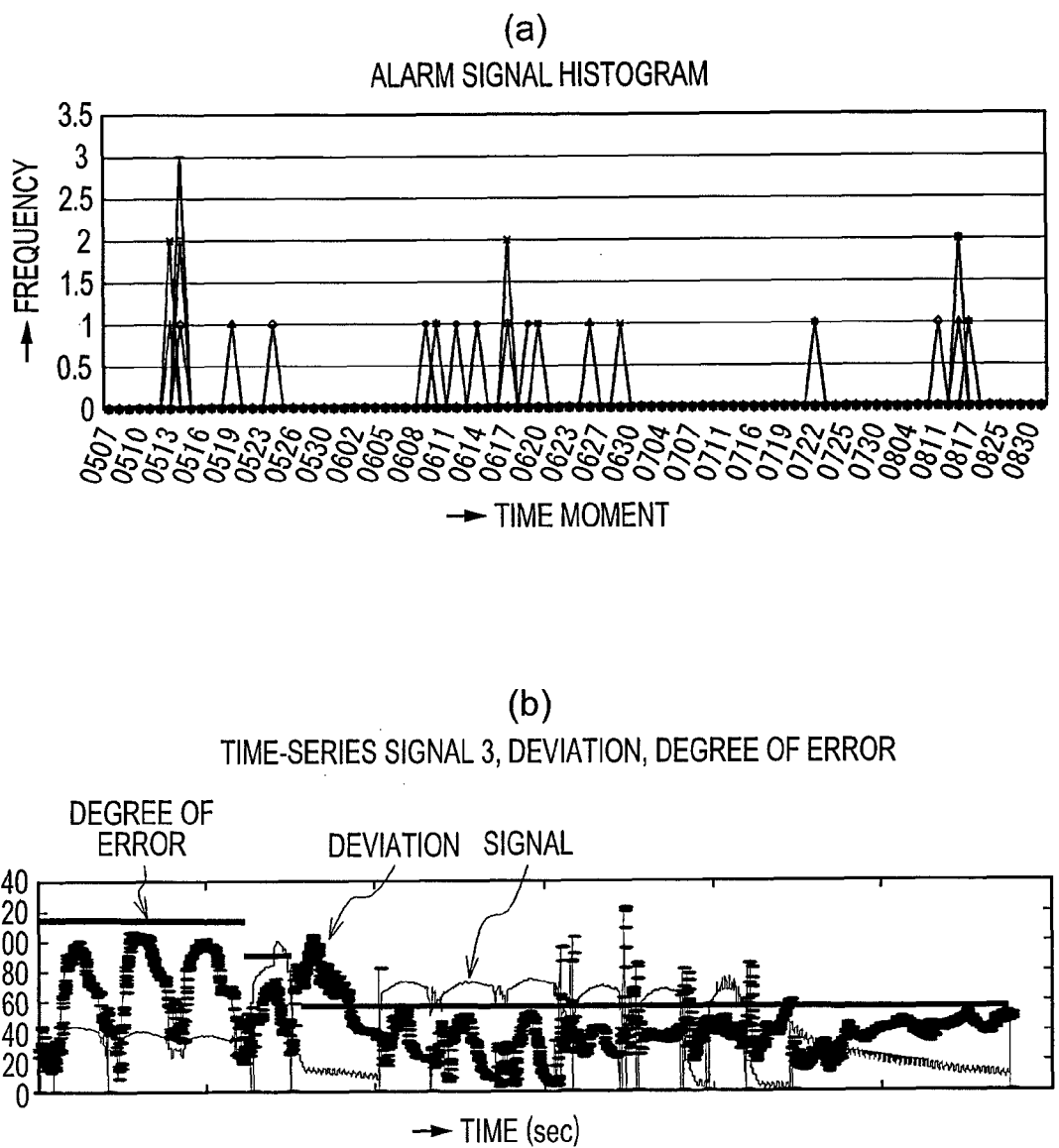
[FIG. 15] A histogram example of an alarm signal.

FIG. 14 shows another embodiment. An alarm signal processing block 12 is added. A history of alarm-signal occurrence as shown in FIG. 15(a) is acquired. Then, the histogram is displayed. It is readily understood that the degree of error is high in an interval in which the frequency of occurrence is high. To address this, as shown in FIG. 15(b), in view of the frequencies in the histogram, a combination of an alarm signal and an discrepancy value is used to add the degree of error and confidence or to make an error determination at an error identifying unit 13 shown in FIG. 1.

Figure 16:
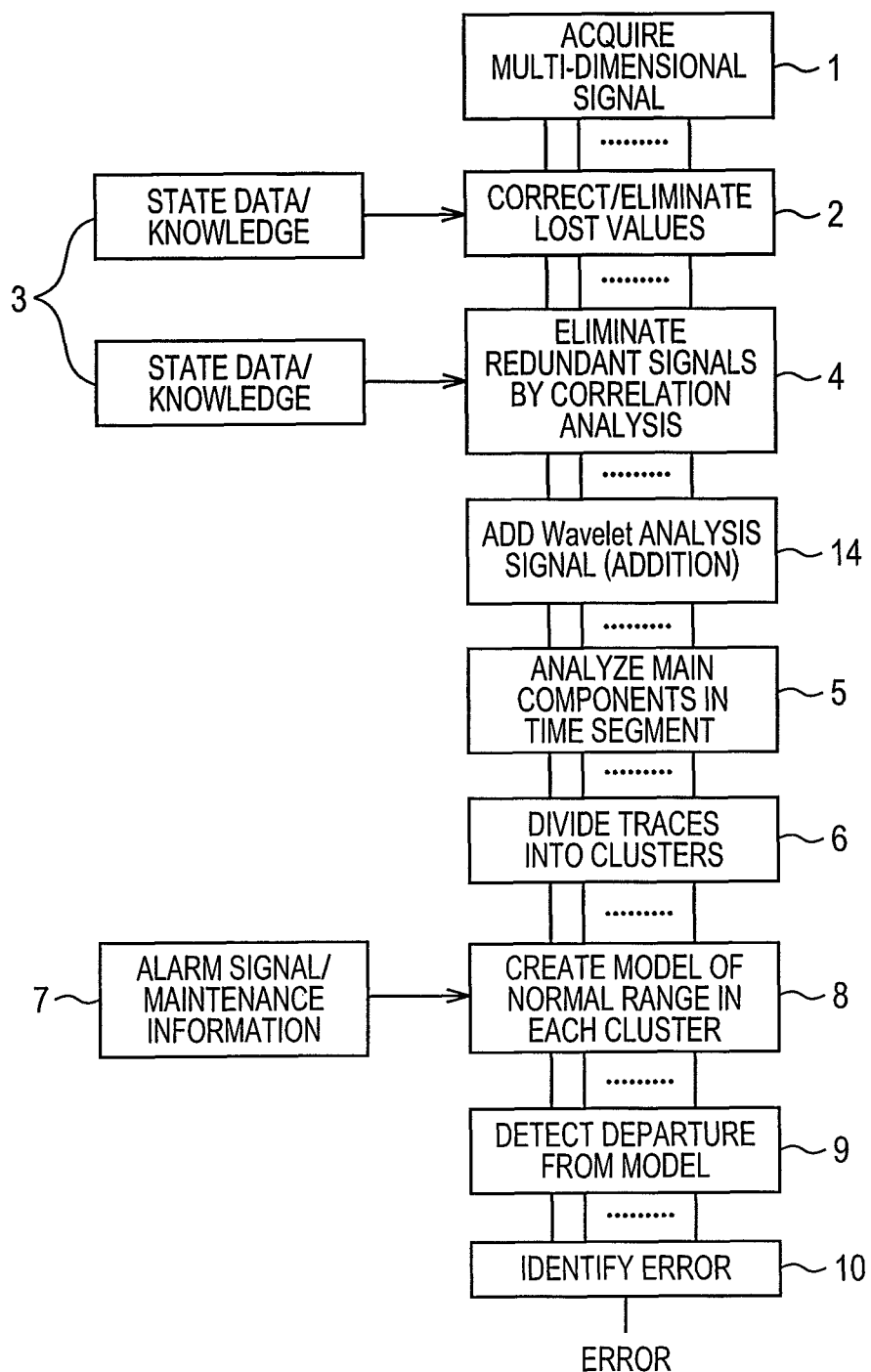
[FIG. 16] A chart illustrating a fourth embodiment according to the present invention.
Figure 17:
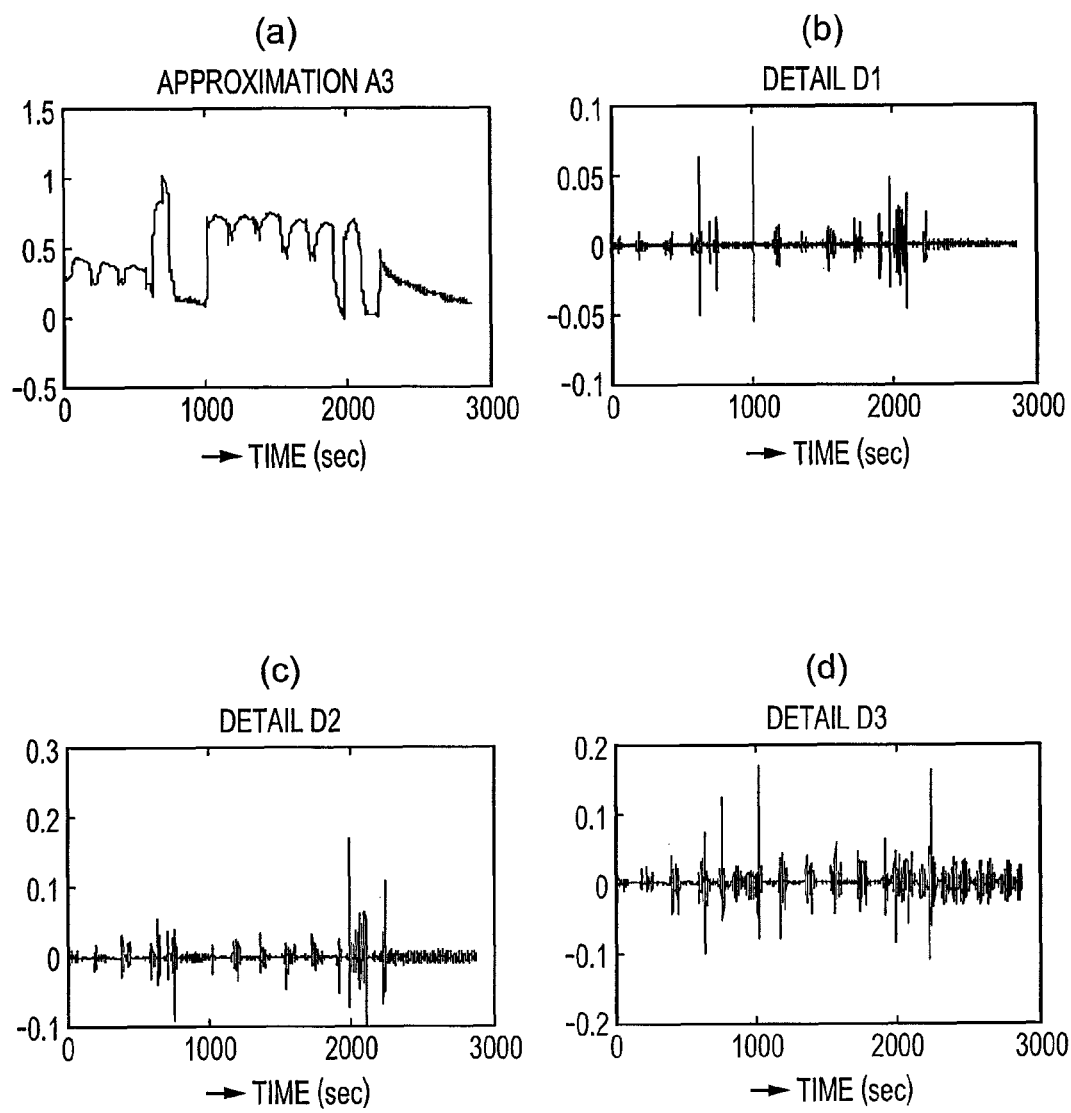
[FIG. 17] An example of Wavelet (transform) analysis.

FIG. 16 shows another embodiment. This embodiment is an example of adding Wavelet (transformation) analysis. A Wavelet analysis signal imparting unit 14 performs Wavelet analysis shown in FIG. 17 on an M-dimensional multi-dimensional time-series signal, and then adds these signals to the M-dimensional multi-dimensional time-series signal. These signals can be replaced with the M-dimensional multi-dimensional time-series signal. On the multi-dimensional time-series signal thus newly added or replaced, discriminators for the local sub space method or the like performs error detection. Note that FIG. 17(a) corresponds to a signal of scale 1 in FIG. 25 described later, FIG. 17(b) corresponds to variations of scale 8 in FIG. 25 described later, FIG. 17(c) corresponds to variations of scale 4 in FIG. 25, and FIG. 17(d) corresponds to variations of scale 2 in FIG. 25.

Figure 25:
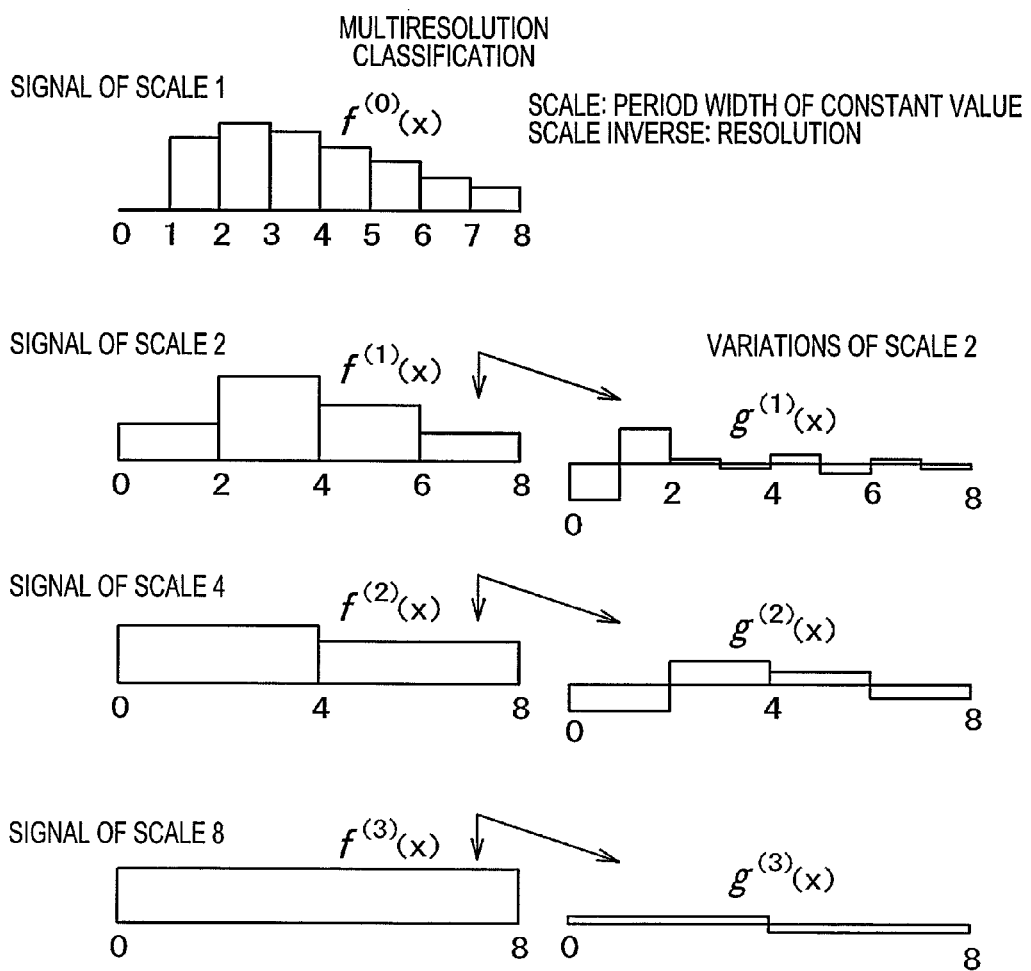
[FIG. 25] A diagram illustrating Wavelet transform.

The Wavelet analysis provides multiresolution representations. FIG. 25 shows in diagrammatic form the Wavelet analysis. The signal of scale 1 is the original signal. This is added sequentially to a neighbor to form a signal of scale 2. A difference between the signal of scale 2 and the original signal is calculated to generate a variations signal of scale 2. Repeating this process in sequence, a constant-value signal of scale 8 and its variations signal are obtained finally. After all, the original signal can be decomposed into the variations signals of the respective scales 2, 4, 8 and a DC signal of scale 8. Accordingly, such variations signals of the respective scales 2, 4, 8 are assumed as new feature signals and added to the multi-dimensional time-series signal.

In non-steady signals such as a pulse or impulse, a frequency spectrum obtained through Fourier transform spreads over the full range, making it difficult to extract features from the individual signals. The Wavelet transform providing a time-localized spectrum provides advantages in measurement on data including many non-steady signals including pulses, impulses or the like such as in chemical processes.

In the case of a first order lag system, the pattern is not easily observed using only the time-series state, but an observable feature may possibly occur on a time-frequency domain, so that the Wavelet transform is often effective.

Applications of the Wavelet analysis is detailed in "Wavelet Kaiseki no Sangyo Oyo (Industry Application of Wavelet Analysis)" by S. Shin, edited by The Institute of Electrical Engineers of Japan, 2005 published by Asakura Publishing Co., Ltd. The wavelet analysis apply to various objects such as control-system diagnosis in chemical plants, error detection in control air-condition plant control, error monitoring of a firing process for cement, control for glass melting furnace, and the like.

A difference of the present embodiment from the prior art is that the Wavelet analysis is treated as multiresolution representations, and the information of the original multi-dimensional time-series signal is made obvious by the Wavelet transform. Then, the information is treated as multivariate data, thus achieving early detection an error in a feeble stage. In short, early detection as prediction becomes possible.

A description will be given of another example of applying the Wavelet analysis to classification. This example is the case when there is a considerable amount of error data and the teaching is possible. The following symbols are used.

[Equation 1]
N: Data length of 1 sequence (the number of samples)
m: Order of AR model
K: The number of classes
$N_p$: The number of sequences of training data
$Y_t$: Time-series signal (t=1–N)

$$z_{t-1} = [y_{t-1}, y_{t-2}, \Lambda, y_{t-m}]^T$$

$$Z_N = \{y_1, y_2, K, y_N\}$$

$Z_n^j$: $j^{th}$ observation value series
$C_i$: Class$^i$ ($^i$=1–K)
$F_j$: AR coefficient (j=1–m)

$$\Phi = [f_1, f_2, \Lambda, f_m]^T$$

$$q = [\Phi^T, r]^T \quad \text{[Equation 1]}$$

$P_r(C_i)$: Prior probability of class$^i$
$p(C_i|Z_N)$: Posterior probability of class$^i$
$p(Z_N|C_i)$: Conditional probability density function of time-series data $Z_N$ on class $C_i$
$p(Z_N|q)$: Conditional probability density function of time-series data $Z_N$ on parameter q First, the following model is assumed.

$$y_t = \sum_{j=1}^{m} \phi_j y_{t-1} + v_t = \Phi^T z_{t-1} + v_t, \, m+1 \le t \le N \quad \text{[Equation 2]}$$

where $v_t$ is Gaussian white sequence with variance p, mean value 0.

Here, $p(Z_N|\theta)$ is considered.

$$p(Z_N \mid \theta) = p(y_N, y_{N-1}, \Lambda, y_1 \mid \theta)$$
$$= p(y_1, y_2, \Lambda, y_m, \theta) \mid p(\theta) \times$$
$$\prod_{t=m+1}^{N} p(y_t \mid y_{t-1}, y_{t-2}, \Lambda, y_1, \theta)$$

where $y_1, y_2, \Lambda, y_m$ are used as observation values and $p(y_1, y_2, \Lambda, y_m, \theta) = p(y_1, y_2, \Lambda, y_m) p(\theta)$ is assumed, $$p(Z_N \mid \theta) = p(y_1, y_2, \Lambda, y_m) \prod_{t=m+1}^{N} p(y_t \mid y_{t-1}, y_{t-2}, \Lambda, y_1, \theta)$$

Here, since $v_t$ is assumed to be gauss distribution, $p(y_t|y_{y-1}, \Lambda, y_1, \theta)$ is also gauss distribution, $$p(y_t \mid y_{t-1}, \Lambda, y_1, \theta) = \frac{1}{\sqrt{2\pi\rho}} \exp\left(-\frac{1}{2\rho}(y_t - \Phi^T z_{t-1})^2\right)$$

Accordingly, $p(Z_N|\theta)$ is expressed by the following equation.

$$p(Z_N \mid \theta) = p(y_1, y_2, \Lambda, y_m) \left(\frac{1}{2\pi\rho}\right)^{(N-m)/2} \exp\left(-\frac{1}{2\rho} \sum_{t=m+1}^{N} (y_t - \Phi^T z_{t-1})^2\right)$$

Log likelihood $\ln p(Z_N|\theta)$ is partially differentiated by $\Phi$, p, which is set equal to zero, then the maximum likelihood estimate of a parameter is calculated as:

$$\hat{\Phi} = \left( \sum_{t=m+1}^{N} z_{t-1} z_{t-1}^T \right)^{-1} \left( \sum_{t=m+1}^{N} z_{t-1} y_t \right)$$

$$\hat{\rho} = \frac{1}{N-m} \sum_{t=m+1}^{N} \left( y_t - \hat{\Phi}^T z_{t-1} \right)^2$$

Next, the following equation is considered as a discriminant.

$$I^* = \underset{i}{\text{ArgMax}} \ln p(C_i | Z_N) \quad \text{[Equation 3]}$$

The above equation employs, as a discrimination class, a class with a maximum posterior probability of class $C_i$ when observation value series $Z_N$ is obtained.

$$I^* = \underset{i}{\text{ArgMax}} \ln p(Z_N | C_i) P_p(C_i)$$

Here, parameter θ determining a system is constant in each class, and when assuming $p(\theta|C_i) = \delta(\theta - \theta i)$, $p(Z_N|C_i)$ is expressed as follows:

$$p(Z_N | C_i) = \int p(Z_N, \theta | C_i) d\theta$$
$$= \int p(Z_N | \theta, C_i) p(\theta | Ci) d\theta$$
$$= \int p(Z_N | \theta, C_i) \delta(\theta - \theta_i) d\theta$$
$$= p(Z_N | \theta_i, C_i)$$
$$= p(Z_N | \theta_i)$$

Accordingly, a discriminant is expressed as follows:

$$I^* = \underset{i}{\text{ArgMax}} \ln p(Z_N | \theta_i) P_p(C_i)$$

For parameter estimation, a maximum likelihood estimation method of maximizing the likelihood defined by the following equation is used.

$$L = \sum_{j=1}^{N_p} \ln p(Z_N^j | \theta_i) \quad \text{[Equation 4]}$$

where $Z_n^j$ is $j^{th}$ observation value series, and $N_p$ is the number of sets of training data. From the results of the above description, a discriminant, a parameter estimation equation are expressed as follows.

[Discriminant]

$$I^* = \text{Arg} \quad \text{[Equation 5]}$$

$$\underset{i}{\text{Max}} \left( -\frac{N-m}{2} \ln \hat{\rho} i + \ln pr(C_i) - \frac{1}{2\hat{\rho} i} \sum_{t=m+1}^{N} \left( y_t - \hat{\Phi}_i^T Z_{t-1} \right)^2 \right)$$

[Parameter Estimation Equation]

$$\hat{\Phi}_i = \left( \sum_{j=1}^{N_p} \sum_{t=m+1}^{N} z_{t-1}^j z_{t-1}^{jT} \right)^{-1} \left( \sum_{j=1}^{N_p} \sum_{t=m+1}^{N} z_{t-1}^j y_t^j \right)$$

$$\hat{\rho}_i = \frac{1}{N_p(N-m)} \sum_{j=1}^{N_p} \sum_{t=m+1}^{N} \left( y_t^j - \hat{\Phi}_i^T z_{t-1}^j \right)^2$$

Classification can be achieved based on the above equations. In particular, the above description is of an example of multi-class classification. If the number of classes k is two, a two-class problem, that is, an error detection problem results. Then, applying the result of Wavelet analysis the observation value enables error detection for detecting a time-localized error. In this manner, when there is a considerable amount of error data and the teaching is possible, error detection with higher accuracy is able to be performed in a statistical sense.

Figure 18:
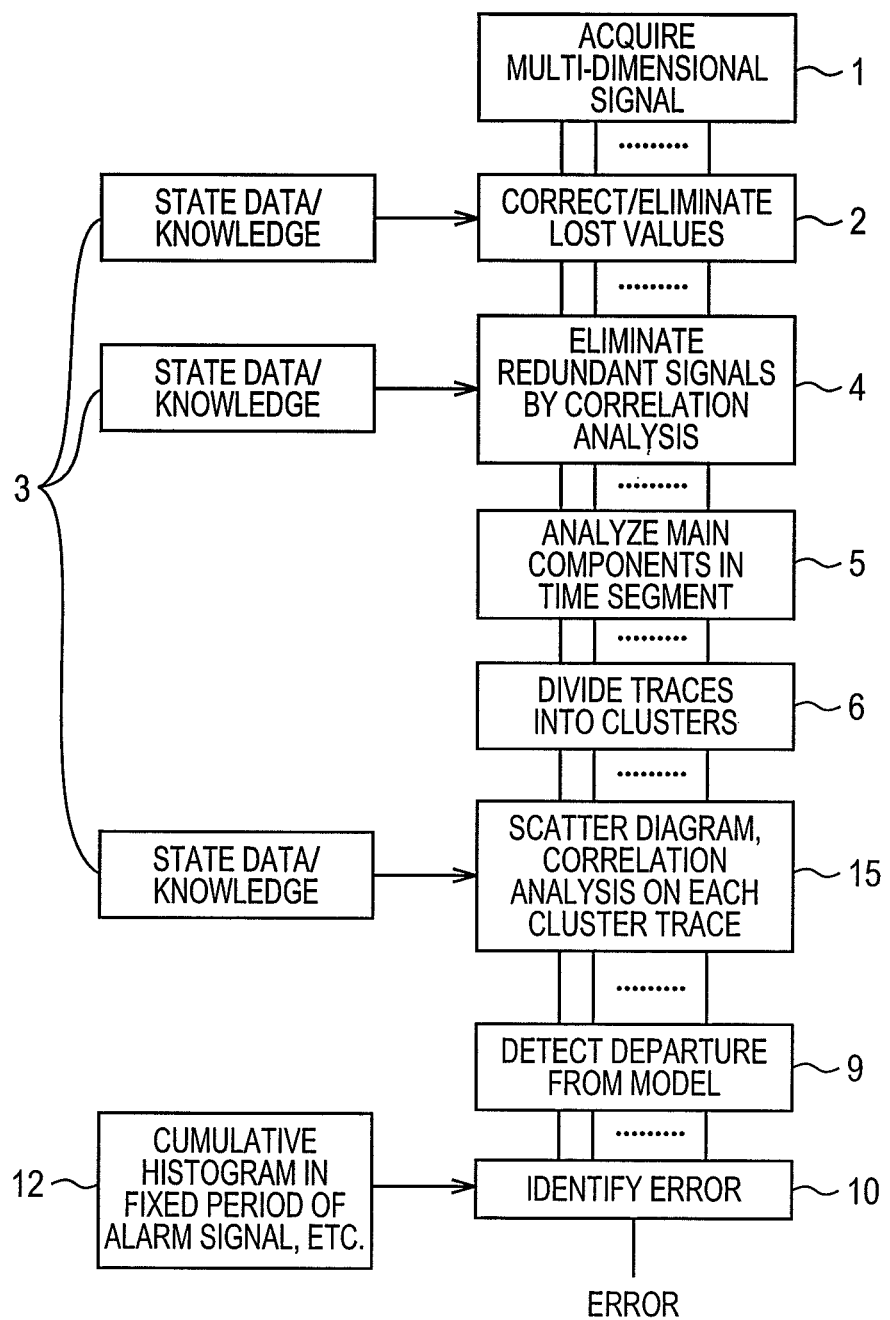
[FIG. 18] A chart illustrating a fifth embodiment according to the present invention.
Figure 19:
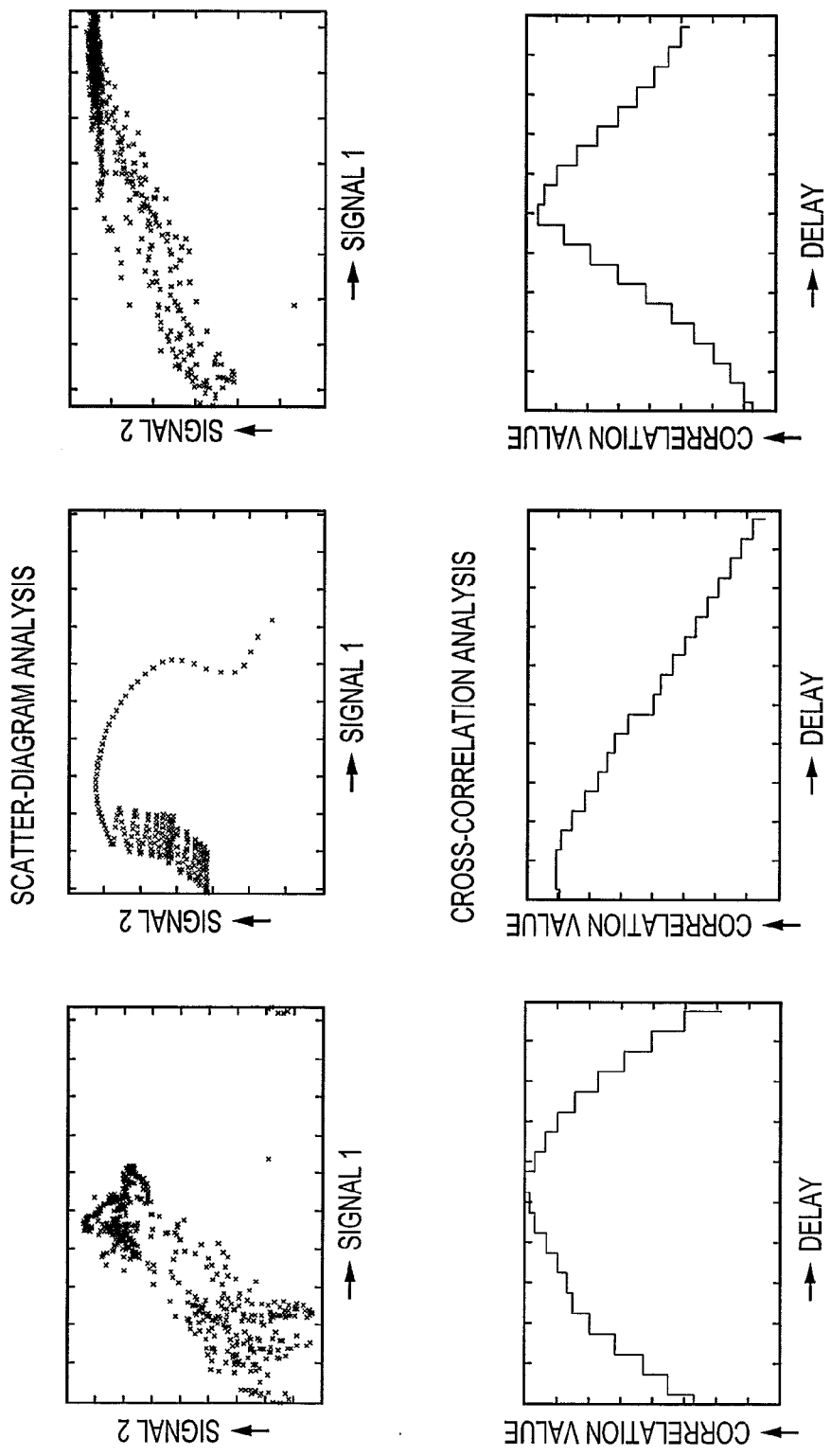
[FIG. 19] Examples of scatter-diagram analysis and cross-correlation analysis.

FIG. 18 shows another embodiment. This embodiment is an example of adding a scatter-diagram correlation analysis unit 15. FIG. 19 shows an example of scatter-diagram correlation analysis is performed on a multi-dimensional time-series signal in r-dimensions. In the cross-correlation analysis in FIG. 19, a delay lag is considered. Typically, a position of the maximum value of a cross-correlation function is called "lag". According to this definition, a time lag between two phenomena is equal to a cross-correlation function lag.

The positive and negative of a lag depends on which of two phenomena occurs earlier. The result of such scatter-diagram analysis or correlation analysis represents a correlation between time-series signals, but is able to be effectively used for characterizing each cluster and can be an indicator for determining similarity between clusters. For example, similarity between clusters is determined from the degree of agreement between the lags. As a result, merging of similar clusters shown in FIG. 11 and the like are made possible. Modeling is executed using data after the merging process. Another technique may be employed for the method of merging.

Figure 20:
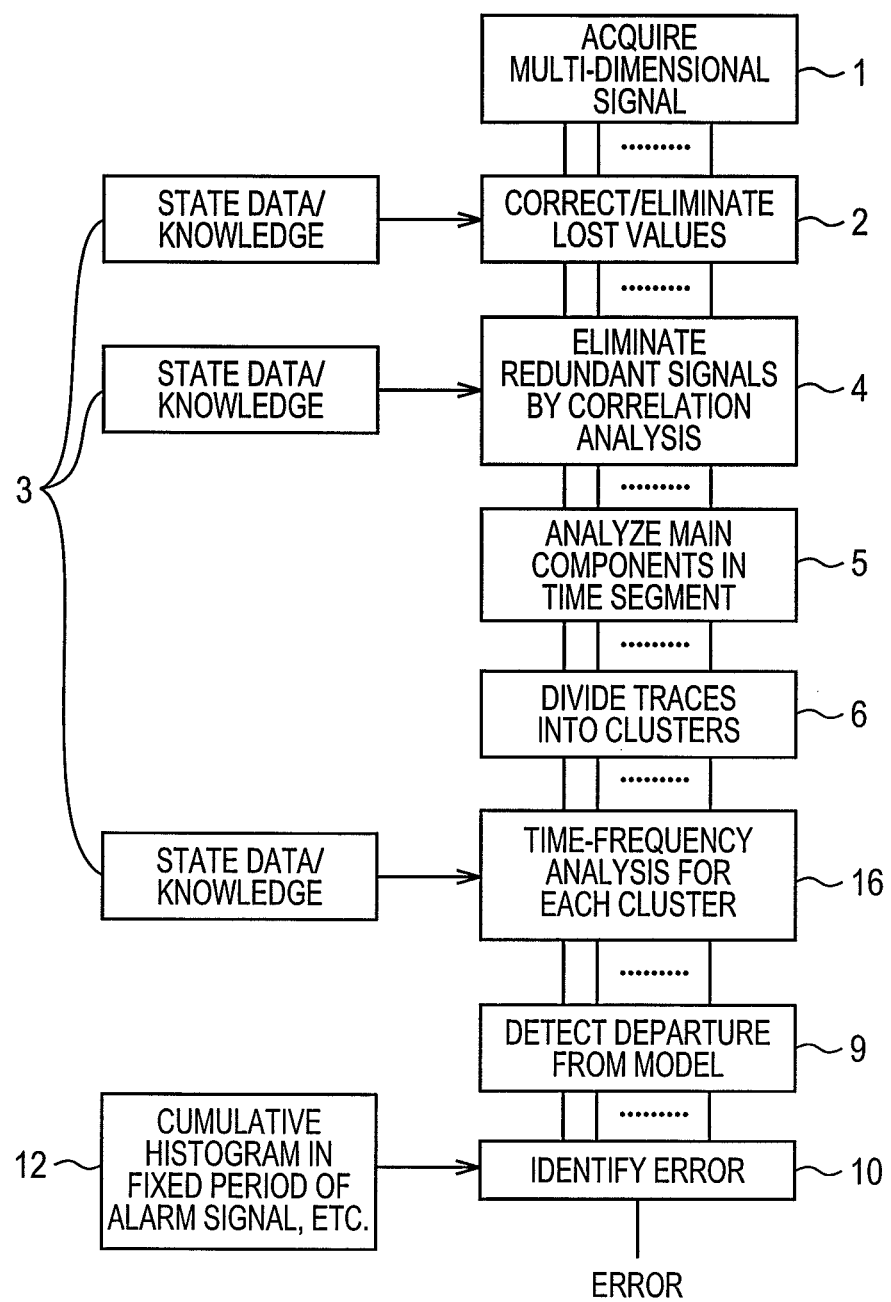
[FIG. 20] A chart illustrating a sixth embodiment according to the present invention.
Figure 21:
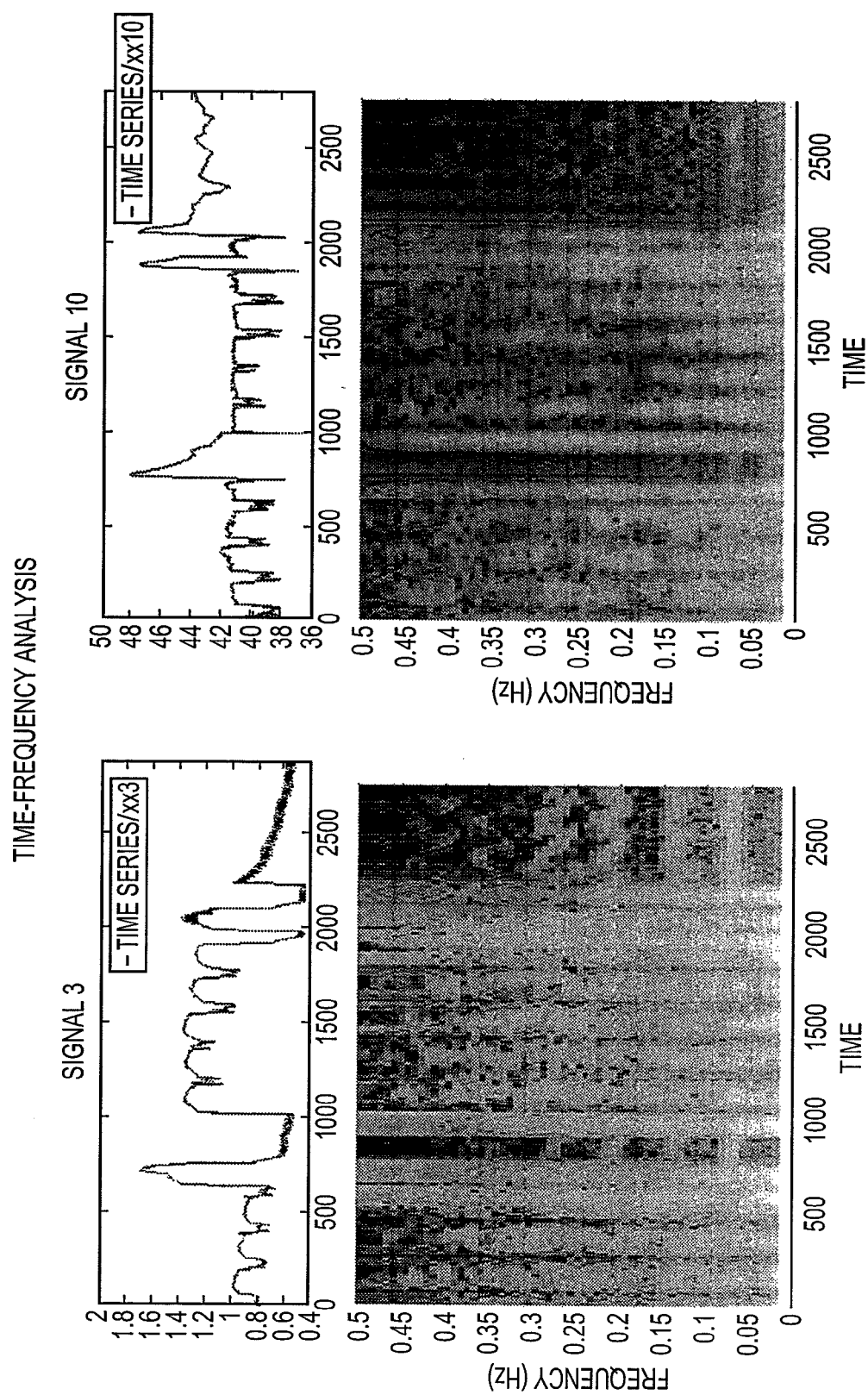
[FIG. 21] An example of time-frequency analysis.

FIG. 20 shows another embodiment. This embodiment is an example of adding a time-frequency analysis unit 16. FIG. 21 shows an example of performing time-frequency analysis on multi-dimensional time-series signals in r-dimensions. The time-frequency analysis or the scatter-diagram correlation analysis is made so that these signals are added to multi-dimensional time-series signals in M-dimensions. Alternatively, the signals are replaced with the multi-dimensional time-series signals in M-dimensions.

Figure 22:
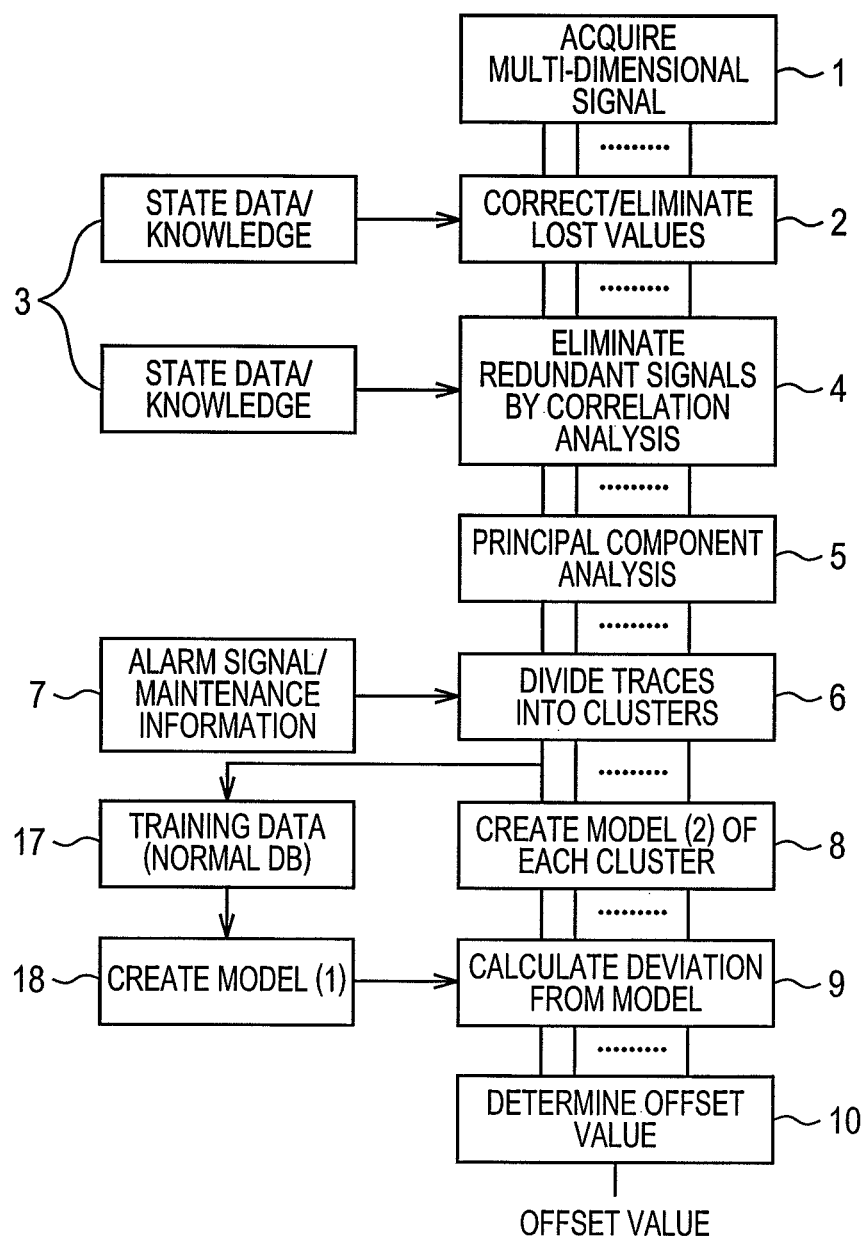
[FIG. 22] A chart illustrating a seventh embodiment according to the present invention.
Figure 23:
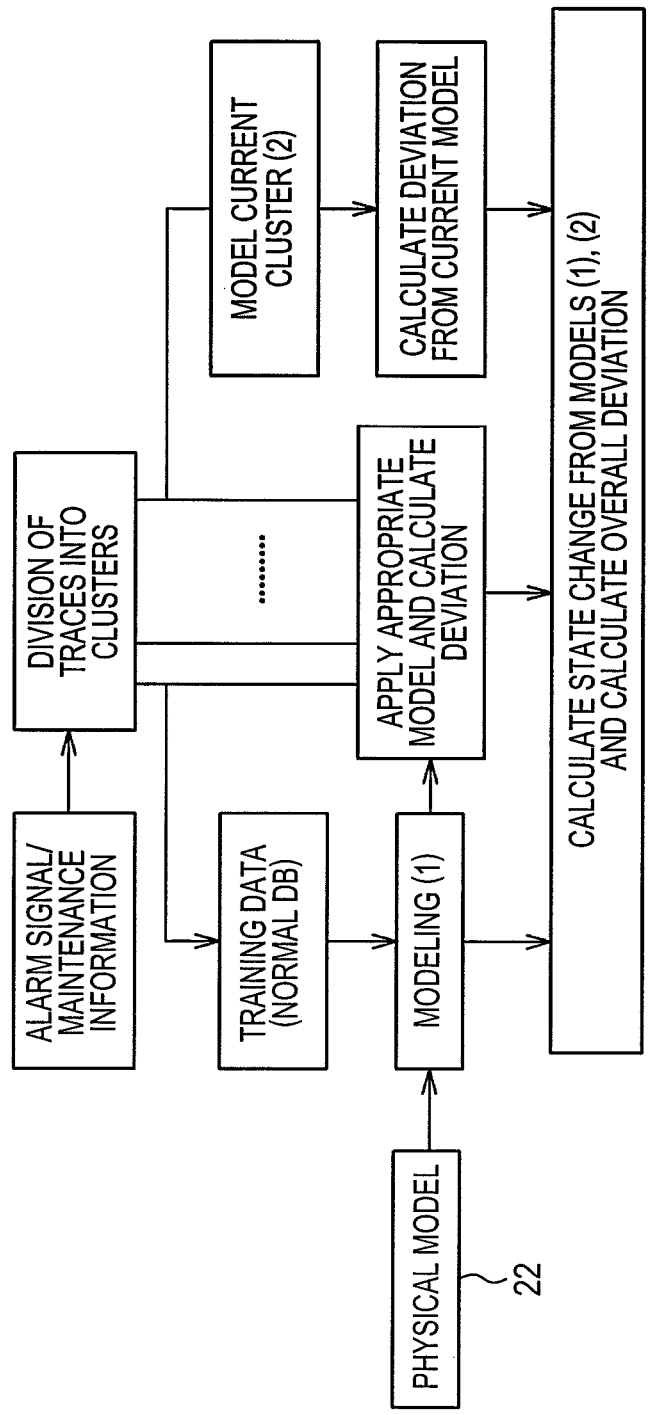
[FIG. 23] A chart illustrating in detail the seventh embodiment according to the present invention.

FIG. 22 shows another embodiment. This embodiment is an example of adding DB17 storing training data and modeling (1) 18. FIG. 23 shows the details. By the modeling (1), the training data is modeled as a plurality of models. Then, a similarity to the observation data is determined, and the appropriate models are assigned. Then, a deviation from the observation data is calculated. Modeling (2) is a similar block to that in FIG. 1, and a deviations from the model obtained from the observation data are calculated.

A state change is calculated from the deviations of the modeling (1), (2) and an overall deviation is calculated. Here, the modeling (1) and the modeling (2) can be evenly treated, but may be weighted. That is, when considering the training data as the basics, the weight of the model (1) is increased, whereas when considering the observation data as the basics, the weight of the model (2) is increased.

According to the representation shown in FIG. 12, if a comparison of a sub space model created by the modeling (1) between clusters is made, and the clusters are primarily in the same state, the state change can be recognized. Then, if the sub space model of the observation data moves from there, the state change can be read. When the state change is caused by an intended reason such as parts replacement the like, that is, when a design side understands the state change, if the change caused by the intended reason should be permitted, the weight of the model (1) is decreased and the weight of the model (2) is increased. If the state change is caused by a not-intended reason, the weight of the model (1) is increased. When, for example, a parameter a is used as the weight of the model (1), formulation is given as $\alpha \times model(1)+(1-\alpha) \times model(2)$.

The weight of the model (1) may be of a forgetful type in which the older the weight, the more the weight is reduced. In this case, importance is attached to a model based on late data.

In FIG. 23, a physical model 22 is a model simulating an intended engine or the like by a simulation.

When sufficient knowledge on the intended engine or the like is available, since the intended engine or the like can be represented by a discrete-time (non)linear-state space model (expression in a state equation or the like), the intermediate value, the output and the like are able to be estimated. Accordingly, according to the physical model, error detection can be performed based on a deviation from this model.

It should be understood that the model (1) of the training data can be modified according to the physical model. In an opposite manner, the physical model can be modified according to the model (1) of the training data. As a modification of the physical model, findings as past performance can be incorporated as a physical model. Data transitions accompanying occurrence of an alarm or parts replacement can be incorporated into the physical model. Alternatively, the training data (individual data items, a barycenter position, and the like) may be moved in association with occurrence of an alarm or parts replacement.

Because a statistics model is effective when understanding of a process for generating data is poor, the statistics model is mainly used for the physical model in FIG. 23, as shown in FIG. 1 to FIG. 22. Distance and similarity can be defined even when a step of generating data is not clear. In the case of an image to be measured, a statistics model is also effective when an image generation process is not clear. When even a bit of knowledge about something to be measured can be used, the physical model 22 can be effectively used.

Figure 26:
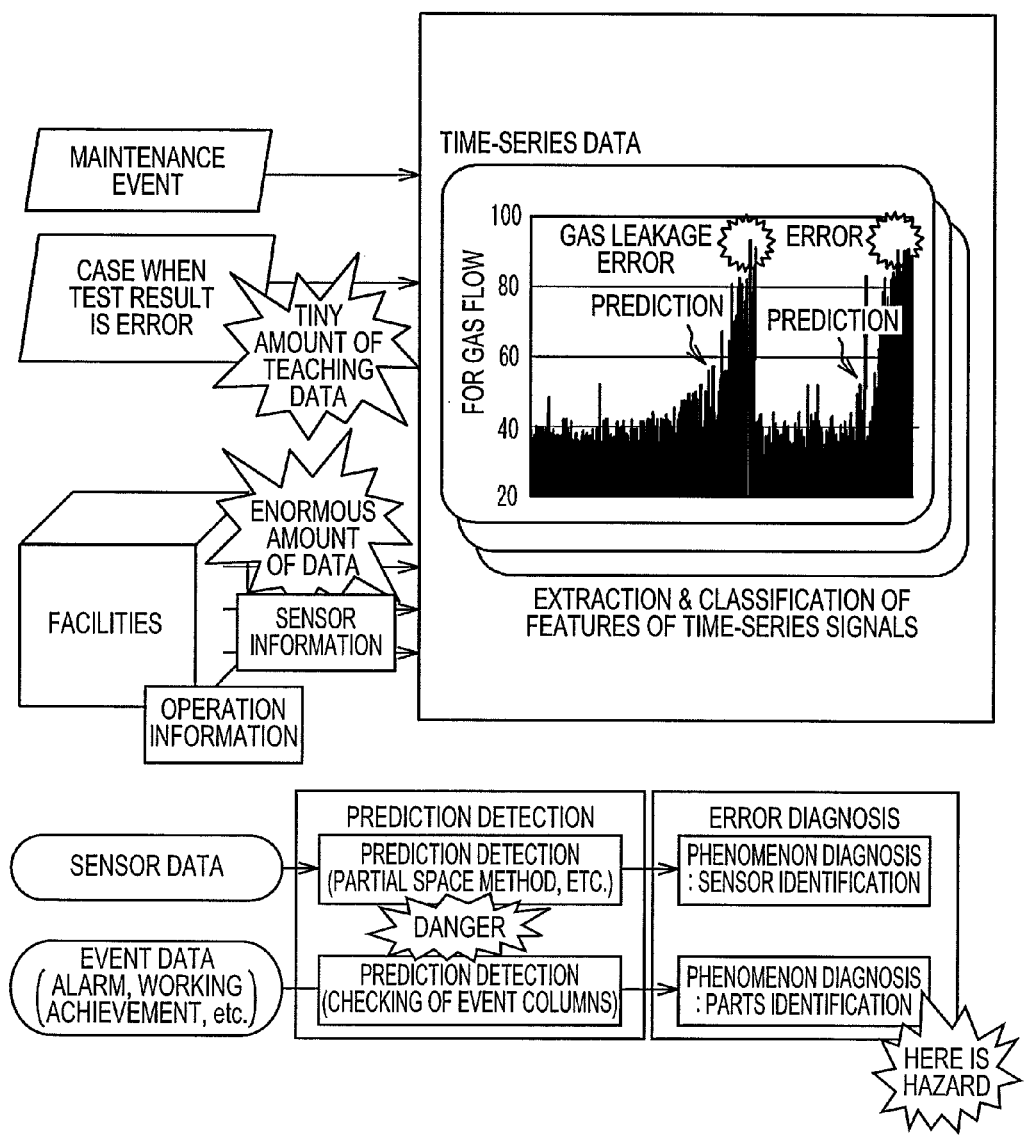
[FIG. 26] A diagram illustrating a relationship with error diagnosis.

FIG. 26 shows error detection and diagnosis after the error detection. In FIG. 26, an error is detected from a time-series signal received from the facility, by the method described earlier. Simultaneously, attendant information such as on maintenance event (alarm, working achievement and the like) and the like is captured for highly-sensitive error detection. As shown in FIG. 26, if an error at an early stage is predicatively discovered, some measures can be taken before the error leads to a failure resulting in operation shutdown. For this purpose, error diagnosis is conducted based on this prediction.

To facilitate understanding, the error diagnosis is divided into phenomenon diagnosis which identify a sensor containing prediction and cause diagnosis which identify a part suspected to causing a failure. The error detection unit outputs information on feature value as well as a signal representative of presence/absence of an error, to the error diagnosis unit. The error diagnosis unit makes diagnosis based on the received information.

Figure 27:
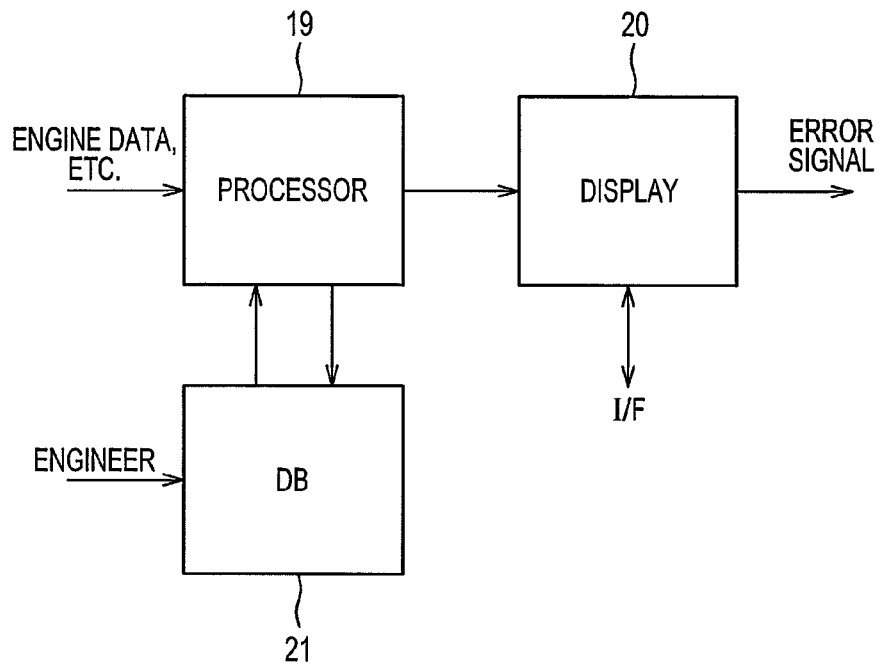
[FIG. 27] A block diagram of hardware.

FIG. 27 shows a hardware structure. A processor executing error detection receives sensor data of the intended engine or the like, then executes processes of recovering lost values and the like, and then stores the data to a database DB. The processor uses observation data and DB data to perform error detection, and outputs an error detection signal. A display unit displays display various types of representation as described in the embodiments. Trends can be displayed.

Regarding the database DB, a skilled engineer manipulates the DB. Specifically, an error instance and a measures instance can be taught and stored. (1) Training data (normal), (2) error data, (3) measures contents are stored. The database DB is configured to allow a skilled engineer to reconfigure the database DB, thus achieving a refined, useful database. Data is manipulated by moving training data (individual data items, a barycenter position, and the like) in association with occurrence of an alarm or parts replacement. Also, the acquired data can be added. If error data exists, a technique such as generalized vector quantization or the like can also find application in data movement.

The aforementioned embodiments have described application to a facility such as an engine or the like, but can be applied to another as long as a kind of time-series signals is processed. The present invention can be applied to measurement data of human body. According to the embodiments, even in a large number of states and/or a large number of transitions, error detection can be provided.

Each of the functions described in the embodiments, for example, clustering, main component analysis or Wavelet analysis, is not necessarily carried out, but may be carried out as appropriate with reference to properties of a signal of interest.

Regarding clustering, it should be understood to allow the use of techniques in the data mining field, including not only time traces, but also EM (Expectation-Maximization) algorithm for mixture distribution, k-means clustering and the like. The obtained clusters may be subjected to the discriminator or may be grouped and then subjected to the discriminator. The simplest example is division into two, clusters to which daily observation data belongs and clusters other than the clusters to which it belongs (corresponding to current data which is observed data shown in the feature space on the right-hand area in FIG. 10, and past data antecedent to the current data in terms of time). Existing techniques such as a wrapper method (using, for example, backward stepwise selection by which the most unnecessary feature is one-by-one removed when all the feature values exist) and the like, can be applied to the selection of a sensor signal (feature value).

Figure 30:
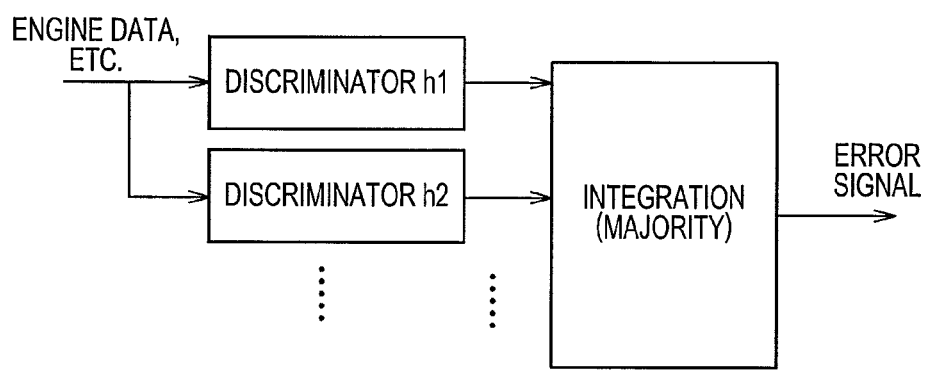
[FIG. 30] An example of classification by integration of a plurality of discriminators.

Further, a plurality of discriminators are provided and the majority of the discriminators can be selected. That is ensemble (group) training using different discriminator group. FIG. 30 shows the configuration example. For example, the discriminator 1 is for the projection distance method, the discriminator 2 is for the local sub space method, and the discriminator 3 is for the linear regression method. If being based on the instance data, an arbitrary discriminator can apply.

A reasons of using a plurality of discriminators is that since the discriminators respectively determine an discrepancy condition on different bases in different intended-data ranges (depending on segment division and the integration), a slight difference is produced between the results derived from them. For this reason, the discriminators are configured on a high-order basis such that stabilization is achieved based on majority rule; detection of all errors without exception is intended by outputting error occurrence when any discriminator detects an error based on logical OR (an discrepancy value itself, that is, a maximum value detection when multiple values exist); or false detection is minimized by outputting error occurrence when any discriminators simultaneously detect an error based on logical AND (minimum value detection when multiple values exist). It should be understood that information such as maintenance information on an alarm signal, parts replacement, and the like can be added in order to achieve the above integration.

All the discriminators h1, h2, ... are set to be of the same type, and therefore the intended data range (depending on segment division and the integration) can be changed for training. For example, a technique such as Bagging, Boosting or the like which is a typical technique of pattern recognition can be applied. The application of the technique enables ensuring of higher accuracy rate in relation to error detection. Here, Bagging is a method of repeatedly executing a process of permitting duplication from N data items to retrieve K data items (restoring extraction) and creating a first discriminator h1 from the K data items, and then a process of permitting duplication from N data items to retrieve K data items and creating a second training unit h2 from the K data items (differing in contents from that of the first discriminator), to create some discriminators from different data, in which the majority rule is employed in the actual use as discriminators.

In Boosting (technique called Adaboost), first, equal weights 1/N are assigned to N data items. A first discriminator h1 trains using all the N data items, then checks an accuracy rate in relation to the N data items after the training, and then calculates confidence $\beta1(>0)$ from the accuracy rate. The weight of the data item for which the first discriminator has made a correct judgment is multiplied by $\exp(-\beta1)$ to reduce the weight, whereas the weight of the data item for which the first discriminator has not made a correct judgment is multiplied by $\exp(\beta1)$ to increase the weight.

A second discriminator h2 trains the weighting using all the N data items to calculate confidence $\beta2(>0)$, and updates the weight of the data item. The weight of the data item for which the two discriminators have made a correct judgment is reduced, whereas the weight of the data item for which the two discriminators have made a wrong judgment is increased. From then, the above process is repeated to create M discriminators. The majority rule with confidence is employed in the actual use as discriminators. Those techniques are applied to clusters, thus improvement in performance is expected.

FIG. 31 shows an example of exemplary configurations of the overall error detection including the discriminator shown in FIG. 30. After the trace clustering, the feature selection and the like, ensemble training is performed to achieve a high classification rate. The method of integration of discriminator outputs has been described earlier, and there are some combinations of which cluster and which discriminator applied to the cluster. For example, the local sub space method is applied to a cluster differing from the observation data to know the condition of discrepancy from a different cluster (also calculate an estimate value). Then, the regression analysis is applied to the same cluster as that in the observation data to know the condition of discrepancy from self cluster.

Then, the outputs of those discriminators are integrated to make an error determination. The condition of discrepancy from another cluster can be determined through the projection distance method or the regression analysis. The condition of discrepancy from self-cluster can be determined through the projection distance method. When an alarm signal is utilized, in accordance with a level of the severity degree of the alarm signal, a cluster to which the severity alarm signal is not added can be measured.

The similarity between clusters is determined, so that similar clusters are integrated, which then can be measured. The discriminator outputs may be integrated through scalar transform processing such as using addition of an discrepancy value, maximum/minimum, OR/AND, and the like. The discriminator output may be treated in vector form as multi-dimensions. It should be understood that the scales of the discriminator outputs are as identical as possible.

Regarding to a manner for association with the clusters, further, error detection may be performed for a first report on other clusters and then error detection may be performed for a second report on self-clusters at the time when data on self-clusters are collected. In this manner, it is possible to call attention to the clients. In this manner, in the embodiment, signal behavior is observed in the relationship between the clusters of interest.

Comprehensive effects relating to some of the embodiments are additionally described. For example, a company having a power generation facility desires a cost reduction for device maintenance so that the device is checked for the duration of guarantee and the parts replaced. This is called time-based facility maintenance. In recent years, however, this is changed to state-based maintenance in which the parts are replaced after checking the device state. For carrying out the state maintenance, collection of normal/error data on the device is required. The quality of state maintenance is depended on the quality and the amount of data. However, collection of error data may often be mare, and the larger the size of the facility, the more the collection of error data is difficult. Accordingly, it is important to detect an discrepancy value from the normal data. According to the aforementioned embodiments, in addition to direct effects that:

an error can be detected from normal data;
high-accuracy error detection is achieved even when data collection is not perfect; and
even if error data is included, the effects of it is permitted, there are secondary advantageous effects that:
the user easily understand phenomenon;
knowledge of engineers can be effectively used; and
physical models can be parallel-used.

Industrial Availability

Utilization as error detection in plants and facilities is achieved.

EXPLANATIONS OF LETTERS AND NUMERALS

1 ... Multi-dimensional signal acquiring unit
2 ... Lost-value correction/elimination unit
3 ... State data, knowledge database
4 ... Redundant-signal-by-correlation-analysis elimination unit
6 ... Trace-division clustering
7 ... Alarm signal/maintenance information
8 ... Each-cluster modeling unit
9 ... Deviation-from-model calculation unit
10 ... Offset-value detection unit
11 ... By-feature-selection ach-cluster modeling unit
12 ... Interval cumulative histogram of an alarm signal and the like
13 ... Error identifying unit
14 ... Wavelet (transform) analysis unit
15 ... Each-cluster trace scatter diagram, correlation analysis unit
16 ... Per-class time-frequency analysis unit
17 ... Training data
18 ... Modeling (1) unit
19 ... Processor
20 ... Display
21 ... Database
22 ... Physical model

The invention claimed is:

1. An error detection method for early detection of errors in a plant or facilities, comprising of steps of:
   acquiring data from a plurality of sensors;
   dividing a trace in a data space into a plurality of clusters over time on the basis of a temporal change of the data;
   wherein a trace in a data space represents the sensor data acquired over a period of time;
   wherein a data space represents attributes of sensor data;
   wherein each cluster corresponds to an operation state of the plant or facilities;
   for each operation state, modeling the corresponding divided clusters by a sub space method; and
   calculating a discrepancy value based on the models of derived clusters as an error candidate.

2. The error detection method according to claim 1, wherein in the modeling, training data including past data from the plurality of sensors is modeled to create a reference model, and the reference model is parallel-used to calculate an discrepancy value as an error candidate.

3. The error detection method according to claim 1, wherein the modeling is performed by use of either regression analysis of every N data removing N data items (N= 0, 1, 2, . . . ) or the sub space method.

4. The error detection method according to claim 3, wherein the sub space method is a projection distance method, a CLAFIC method or a local sub space method for measuring an area around observation data.

5. The error detection method according to claim 4, wherein the detection of the discrepancy value is performed by integration of outputs in the regression analysis, the projection distance method, the CLAFIC method or the local sub space method for measuring an area around observation data.

6. An error detection method for early detection of errors in a plant or facilities, comprising of steps of:
   acquiring data from a plurality of sensors;
   dividing a trace in a data space into a plurality of clusters over time on the basis of a temporal change of the data;
   wherein a trace in a data space represents the sensor data acquired over a period of time;
   wherein a data space represents attributes of sensor data;
   wherein each cluster corresponds to an operation state of the plant or facilities;
   for each operation state, modeling the corresponding divided clusters by a sub space method; and
   displaying the data on a time-series signal to make the divided clusters evident to visualize a state.

7. The error detection method according to claim 6, wherein a first report is output by error detection performed on the clusters on the basis of past data from the plurality of sensors, and a second report is output by error detection performed on the clusters on the basis of current data of the plurality of sensors.

8. An error detection system for early detection of errors in a plant or facilities, comprising:
   a hardware processor;
   a data acquiring unit that acquires data from a plurality of sensors;
   a trace division unit that divides a trace in a data space into a plurality of clusters over time on the basis of a temporal change of the data acquired by the data acquiring unit;
   wherein a trace in a data space represents the sensor data acquired over a period of time;
   wherein a data space represents attributes of sensor data;
   wherein each cluster corresponds to an operation state of the plant or facilities;
   a modeling unit that performs modeling in a sub space on the divided clusters corresponding to each operation state which is divided by the trace division unit; and
   an error detection unit that calculates an discrepancy value as an error candidate based on the models of derived clusters which is modeled by the modeling unit.

9. The error detection system according to claim 8, comprising a training database unit that accumulates past data from the plurality of sensors by the data acquiring unit, and models the past data to create a reference model,
   wherein the reference model in the training database unit is parallel-used to calculate an discrepancy value as an error candidate.

10. The error detection system according to claim 8, wherein the modeling is performed by use of either regression analysis of every N data removing N data items (N= 0, 1, 2, . . . ) or a sub space method.

11. The error detection system according to claim 8, wherein the sub space method is a projection distance method, a CLAFIS method or a local sub space method for measuring an area around observation data.

12. The error detection system according to claim 8, wherein the detection of the discrepancy value is performed by integration of outputs in the regression analysis, the projection distance method, the CLAFIS method or the local sub space method for measuring an area around observation data.

13. An error detection system for early detection of errors in a plant or facilities, comprising:
   a hardware processor;
   a data acquiring unit that acquires data from a plurality of sensors;
   a trace division unit that divides a trace in a data space into a plurality of clusters over time on the basis of a temporal change of the data acquired by the data acquiring unit;
   wherein a trace in a data space represents the sensor data acquired over a period of time;
   wherein a data space represents attributes of sensor data;
   wherein each cluster corresponds to an operation state of the plant or facilities;
   a modeling unit that performs modeling in a sub space on the divided clusters corresponding to each operation state which is divided by the trace division unit;
   an error detection unit that calculates an discrepancy value as an error candidate based on the models of derived clusters which is modeled by the modeling unit; and
   a data display unit which displays the data on a time-series signal to make the divided clusters which is divided by the trace division unit evident to visualize a state.

14. The error detection system according to claim 13, wherein a first report is output by error detection performed on the clusters on the basis of the past data from the plurality of sensors, and a second report is output by error detection performed on the clusters on the basis of current data of the plurality of sensors.

* * * * *